(12) United States Patent
Gross

(10) Patent No.: US 9,165,087 B2
(45) Date of Patent: Oct. 20, 2015

(54) VALIDITY PATH NODE PATTERN FOR STRUCTURE EVALUATION OF TIME-DEPENDENT ACYCLIC GRAPHS

(75) Inventor: Rene Gross, Schwarzach (DE)

(73) Assignee: SAP SE, Walldorf (DE)

( * ) Notice: Subject to any disclaimer, the term of this patent is extended or adjusted under 35 U.S.C. 154(b) by 1997 days.

(21) Appl. No.: 11/647,958

(22) Filed: Dec. 29, 2006

(65) Prior Publication Data

US 2008/0162205 A1 Jul. 3, 2008

(51) Int. Cl.
G06F 17/30 (2006.01)
G06Q 10/10 (2012.01)

(52) U.S. Cl.
CPC .... G06F 17/30958 (2013.01); G06F 17/30994 (2013.01); G06Q 10/10 (2013.01)

(58) Field of Classification Search
CPC .................. G06F 17/30958; G06F 17/30994; G06Q 10/10
USPC ........................................ 707/104.1; 705/1–7
See application file for complete search history.

(56) References Cited

U.S. PATENT DOCUMENTS

| | | | |
|---|---|---|---|
| 5,515,487 A * | 5/1996 | Beaudet et al. ............... | 345/440 |
| 5,696,693 A | 12/1997 | Aubel et al. | |
| 6,266,053 B1 * | 7/2001 | French et al. ................. | 715/255 |
| 6,377,259 B1 * | 4/2002 | Tenev et al. ................... | 345/440 |
| 2003/0067481 A1 * | 4/2003 | Chedgey et al. ............. | 345/738 |
| 2004/0015486 A1 * | 1/2004 | Liang et al. ........................ | 707/3 |
| 2004/0186842 A1 | 9/2004 | Wesemann | |
| 2005/0027738 A1 * | 2/2005 | Kraft ........................... | 707/104.1 |
| 2005/0027739 A1 * | 2/2005 | Kraft ........................... | 707/104.1 |
| 2005/0038533 A1 * | 2/2005 | Farrell et al. .................... | 700/73 |
| 2005/0108217 A1 * | 5/2005 | Werner et al. ...................... | 707/3 |
| 2005/0182708 A1 * | 8/2005 | Moudgal ......................... | 705/38 |
| 2006/0150169 A1 | 7/2006 | Cook et al. | |
| 2007/0100832 A1 * | 5/2007 | Klein ................................ | 707/9 |
| 2007/0185904 A1 * | 8/2007 | Matsuzawa et al. ......... | 707/104.1 |
| 2007/0214179 A1 * | 9/2007 | Hoang ........................ | 707/104.1 |
| 2008/0059945 A1 * | 3/2008 | Sauer et al. ..................... | 717/105 |
| 2008/0071595 A1 * | 3/2008 | Chang et al. ....................... | 705/7 |
| 2008/0120129 A1 * | 5/2008 | Seubert et al. ..................... | 705/1 |
| 2008/0162207 A1 | 7/2008 | Gross et al. | |
| 2008/0162563 A1 | 7/2008 | Gross et al. | |

(Continued)

OTHER PUBLICATIONS

USPTO Office Action in U.S. Appl. No. 11/648,401; mailed Nov. 7, 2008; 12 pages.

(Continued)

*Primary Examiner* — Jin-Cheng Wang
(74) *Attorney, Agent, or Firm* — Fish & Richardson P.C.

(57) ABSTRACT

Systems and processes may access data using a generic graph framework or other graph interface upon request from a business application. Some data retrieved by the interface may be organized as an acyclic graph structure that includes some temporal, time-based, or otherwise time-dependent nodes. In some cases, the acyclic graph may include one or more time-dependent relations. As the datasets are time-dependent, the parents/children can be processed based on their identifiers in combination with the corresponding validities. Additionally, the actual validities during evaluation of the graph may yet to be computed for each element out of the validities of its predecessors. This accessed data, with at least some time-dependent data, can be compared to a validity period provided by the business application to generate a graph valid for the validity period.

19 Claims, 12 Drawing Sheets

(56) References Cited

U.S. PATENT DOCUMENTS

2008/0162616 A1 7/2008 Gross et al.
2008/0162777 A1 7/2008 Kaiser et al.

OTHER PUBLICATIONS

USPTO Final Office Action in U.S. Appl. No. 11/648,401; mailed Apr. 30, 2009; 17 pages.
USPTO Advisory Action in U.S. Appl. No. 11/648,401; mailed Jun. 18, 2009; 3 pages.
USPTO Office Action in U.S. Appl. No. 11/647,937; mailed on Jul. 1, 2009; 9 pages.
United States Patent Office's prosecution file for U.S. Appl. No. 11/648,383; 82 pages.
United States Patent Office's prosecution file for U.S. Appl. No. 11/647,937; 104 pages.
United States Patent Office's prosecution file for U.S. Appl. No. 11/648,020; 85 pages.
United States Patent Office's prosecution file for U.S. Appl. No. 11/648,401; 176 pages.
USPTO Office Action in U.S. Appl. No. 11/648,401, mailed on Oct. 2, 2009, 17 pages.
USPTO Office Action in U.S. Appl. No. 11/648,020 mailed May 12, 2010; 6 pages.
USPTO Office Action in U.S. Appl. No. 11/648,401 mailed Oct. 2, 2009; 17 pages.
USPTO Office Action in U.S. Appl. No. 11/648,401 mailed Apr. 29, 2010; 19 pages.
USPTO Final Office Action in U.S. Appl. No. 11/647,937 mailed Oct. 26, 2009; 18 pages.
USPTO Office Action in U.S. Appl. No. 11/647,937 mailed May 26, 2010; 24 pages.
USPTO Office Action in U.S. Appl. No. 11/648,383 mailed Jun. 22, 2010; 15 pages.

* cited by examiner

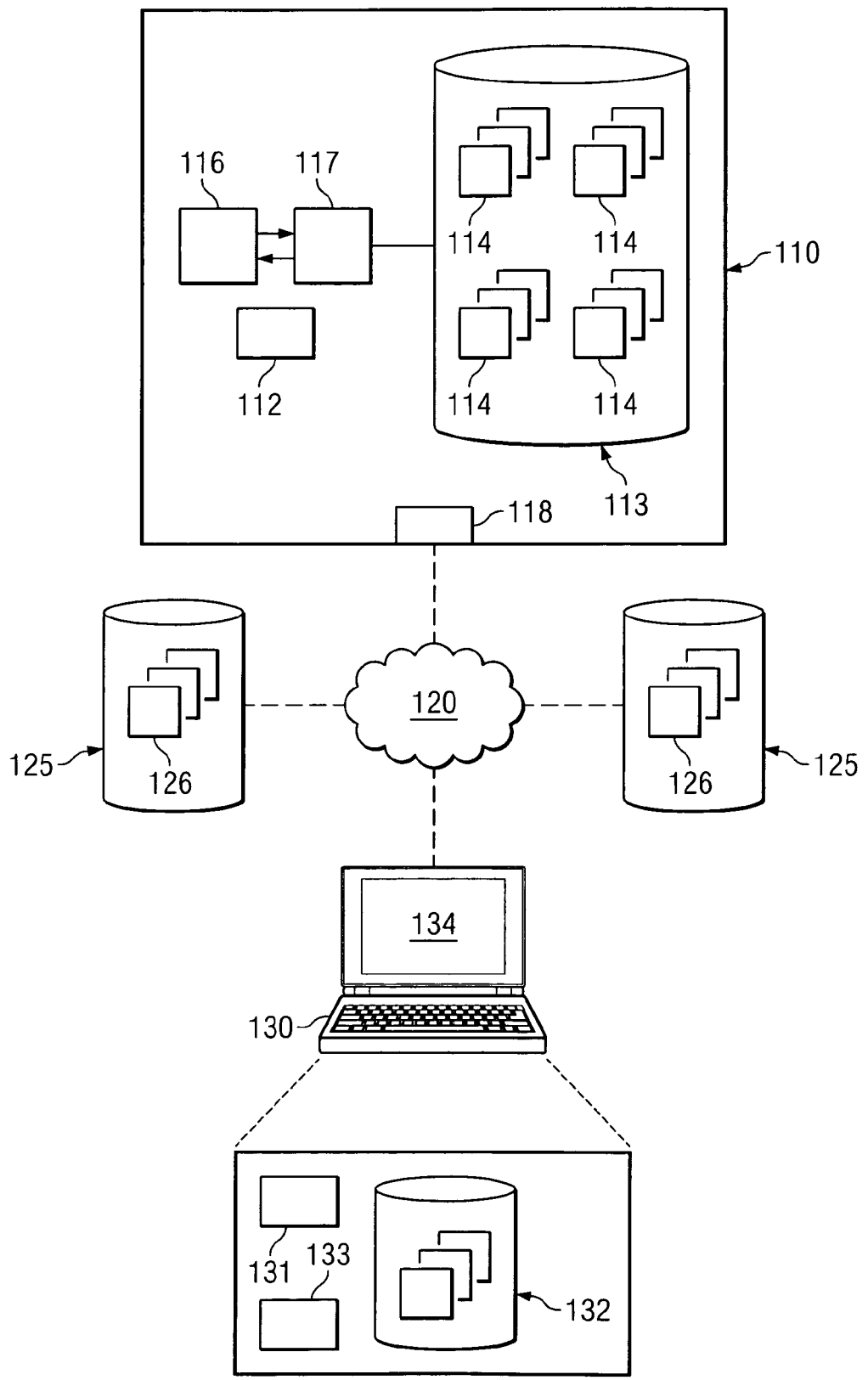

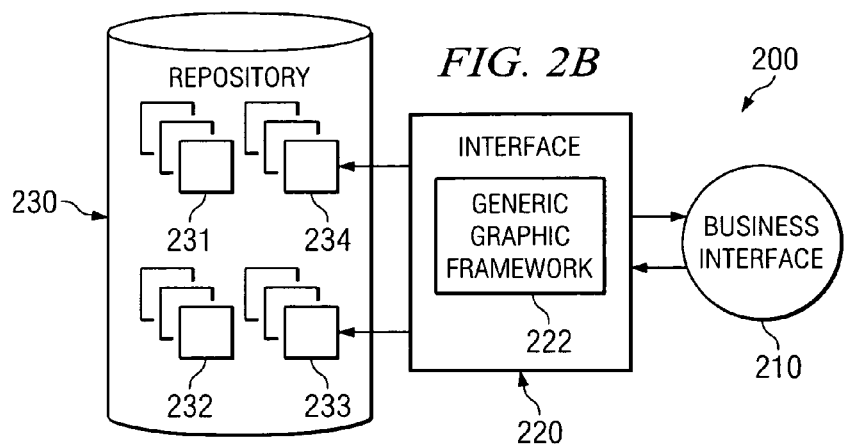
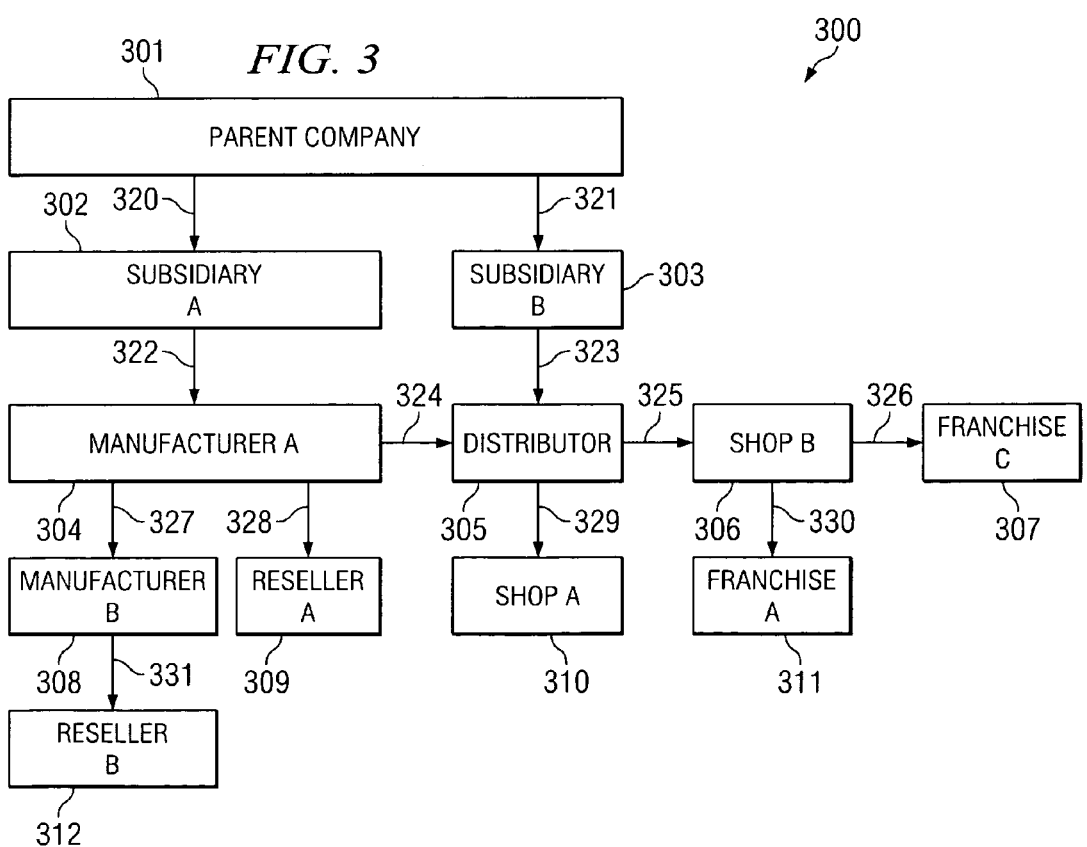

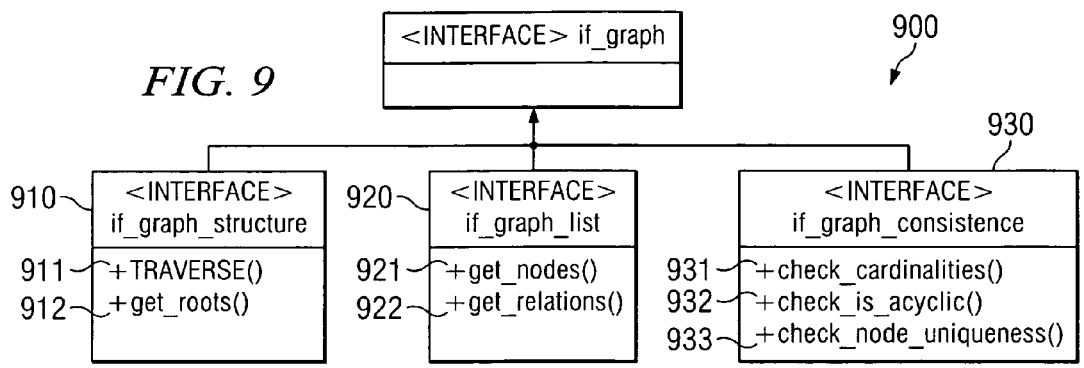
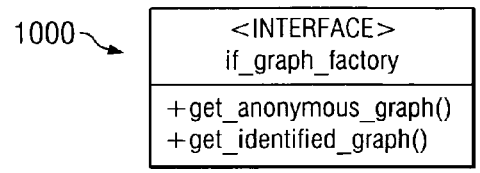
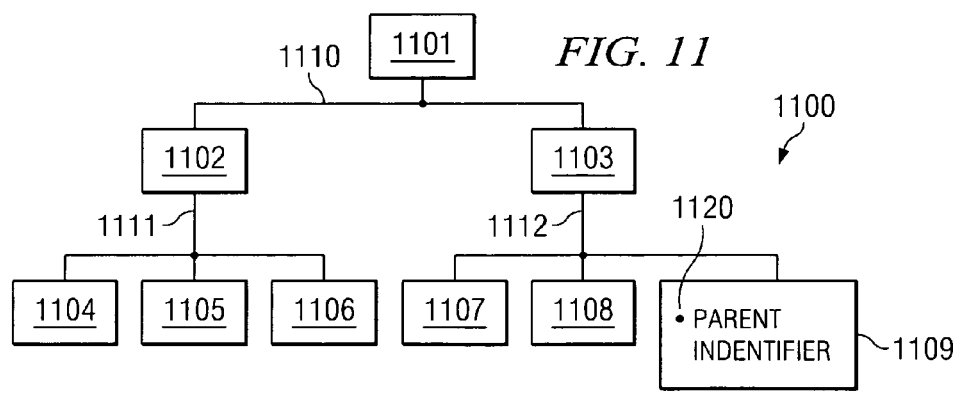
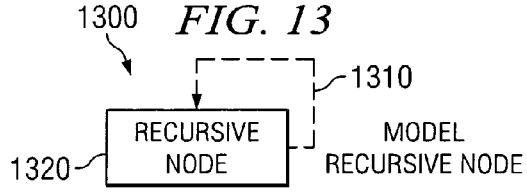
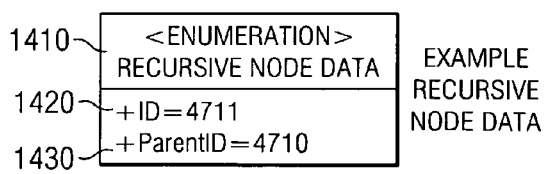
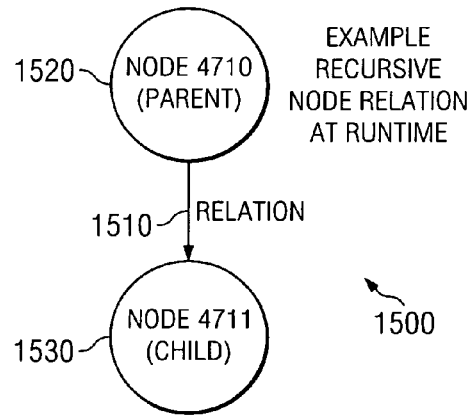

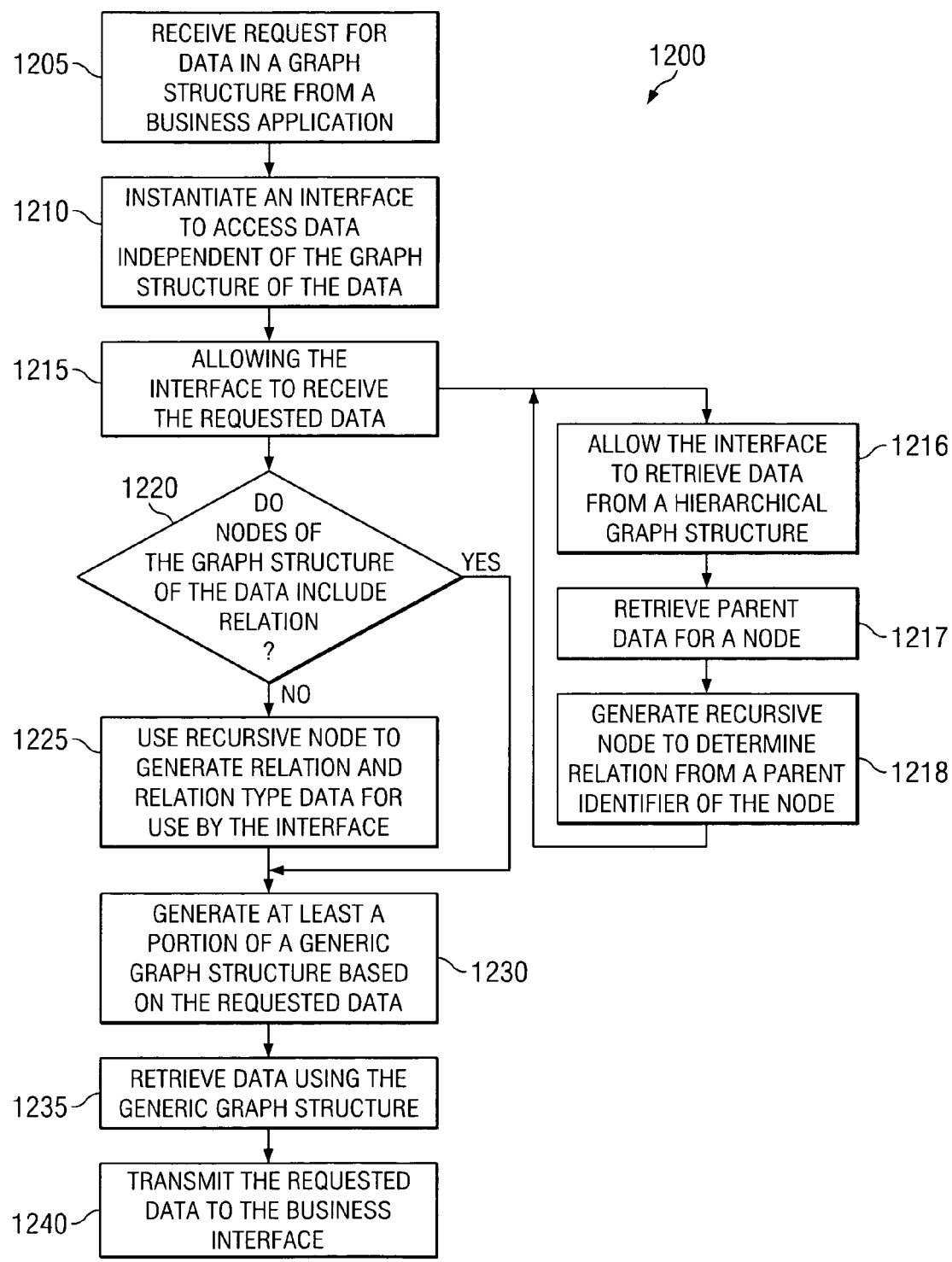

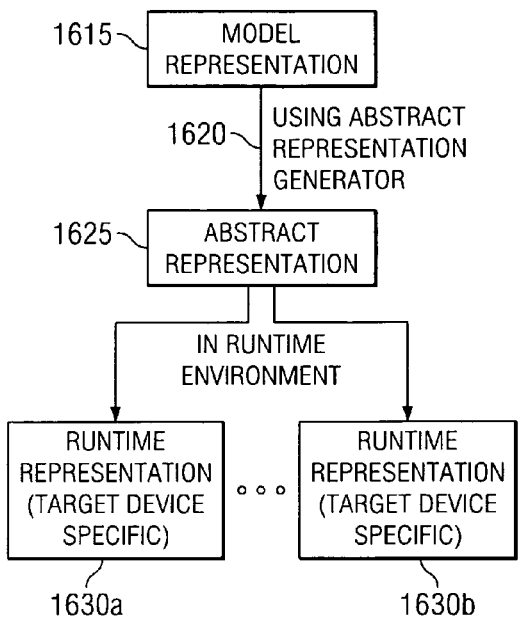
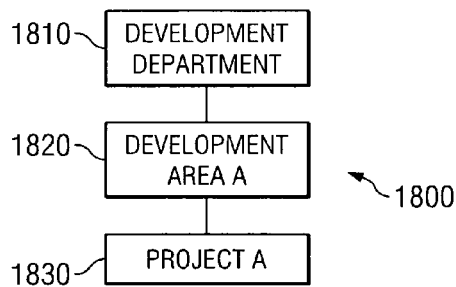
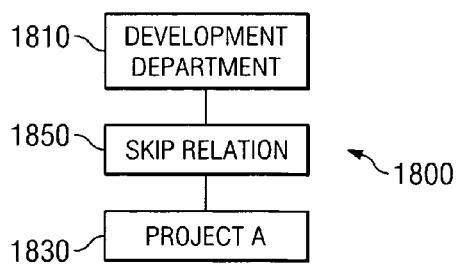
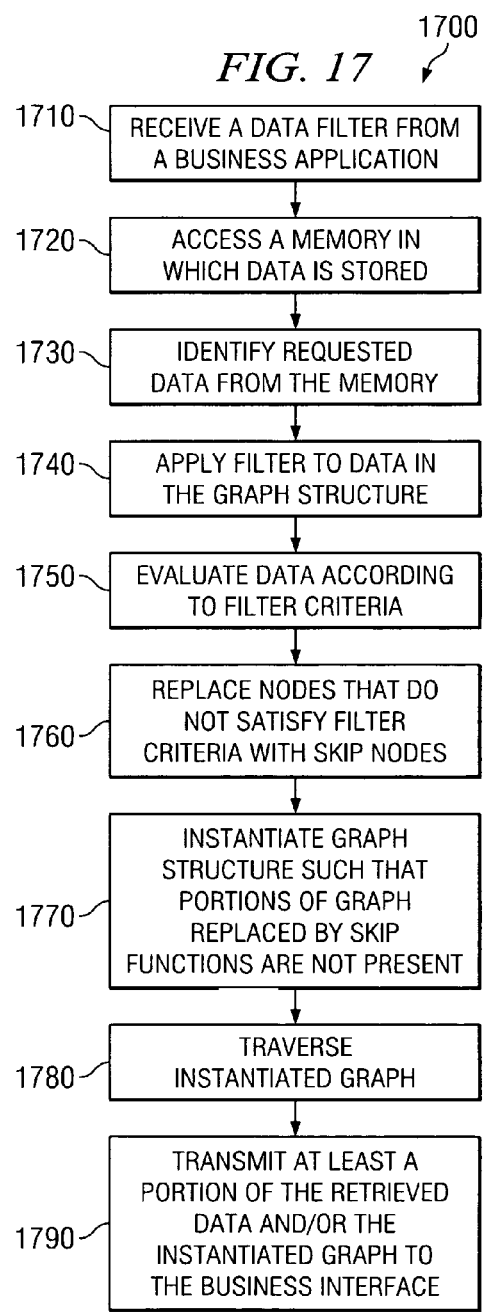

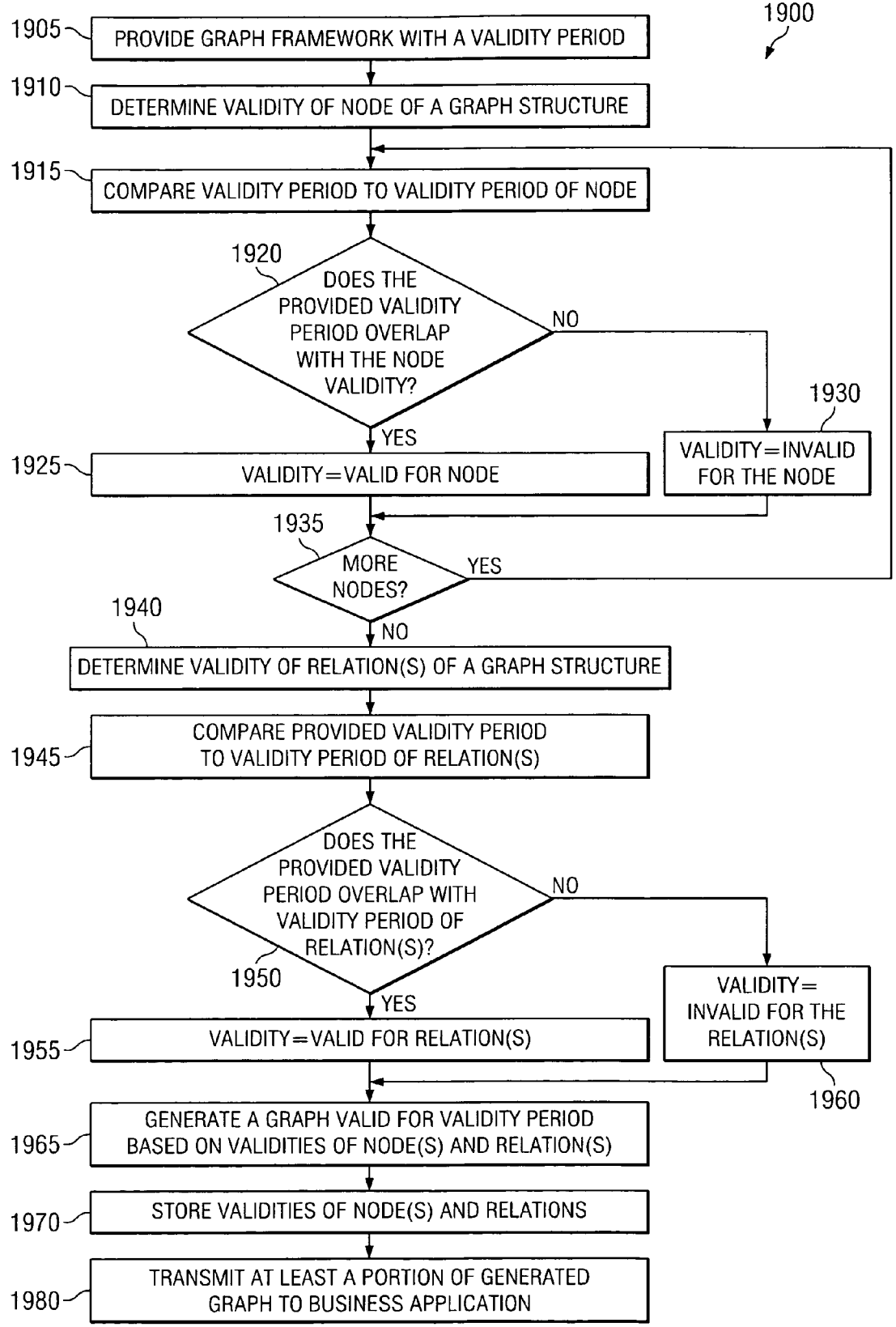

VALIDITY PATH NODE PATTERN FOR STRUCTURE EVALUATION OF TIME-DEPENDENT ACYCLIC GRAPHS

TECHNICAL FIELD

The present invention relates to accessing data and, more particularly, to accessing an acyclic graph structure that includes time-dependent data.

BACKGROUND

Related data often may reside in various graph structures. Generally, graphs are abstract data structures that include of a set of nodes and a set of edges that establish relationships between the nodes, such as parent-child and so forth. Business modules, or other software applications used by businesses and entities, may access and/or process data in different graph forms, such as anonymous and identified graphs. Anonymous and identified graphs may need different attributes to instantiate the graphs. For example, accessing anonymous graphs generally requires some knowledge of root nodes and may not be easily accessed since anonymous graphs are runtime graphs that may exist on a volatile memory of the system. Identified graphs are often obtainable through a global unique identifier (GUID) of a business interface since they reside on a repository.

Other graphs may be time-dependent. This normally means the nodes and relations the graph consists of are only valid for a defined time period. This may require a more sophisticated evaluation of the graph structure than for non-time-dependent graphs. Evaluation of a graph in this context means building the real structure at runtime of a software application out of the datasets of the graph's elements (nodes and relations) including the corresponding validities. This may help answer questions like "what are the child nodes (successors) of the given node?"

In some cases, applications may take care of legacy persistencies (such as DB tables of the legacy system) without the need for migration. For example, these applications are often based on a pull-mechanism, which often indicates that the applications are not getting the data they work on from the caller itself but are responsible for the data retrieval. But the graphs stored in these persistencies are normally persistence-dependent.

SUMMARY

Systems and processes may access data using an interface upon request from a business application. Data may be temporal and not valid for all times requested by a business interface. Thus, the data must be compared to a validity period provided by a business interface to generate a graph valid for the validity period. The interface may generate a generic graph for the validity period to access the data which may facilitate programming, decrease processing times, reduce the need to identify graph structure and/or repository type prior to accessing the data, and/or to allow generic graph functions to be performed on the data independent of the structure of the data.

In one general aspect, a validity period is obtained, received, determined, or otherwise identified. A validity of nodes of an acyclic graph structure is determined by comparing the identified validity period to a validity period of nodes of the graph structure. A graph valid for the validity period is generated by generating nodes of the graph structure that are valid for the validity period.

Implementations may include one or more of the following features. A validity of relations of a graph structure may be determined by comparing the identified validity period to a validity period of relations of the graph structure. A graph valid for the validity period may be generated to include relations of the graph structure that are valid for the validity period. Validity for a node may be determined based on the lesser of the identified validity period or the validity period of a parent of the node. A node in which a parent of the node is not valid for the validity period may be skipped. A graph valid for the validity period may be generated to include validity periods of one or more of the nodes. A graph valid for the validity period may include validity periods of one or more of the relations. The graph structure may include time dependent data. The graph structure may be a runtime graph. Validity of nodes and/or relations of the graph structure may be stored. Validity periods for predecessor nodes may be stored as a node attribute. At least a portion of the graph may be transmitted to a business interface.

Each of the foregoing—as well as other disclosed—example methods may be computer implementable. Moreover some or all of these aspects may be further included in respective systems and software for presenting and otherwise providing context-based content for a computer application. The details of these and other aspects and embodiments of the disclosure are set forth in the accompanying drawings and the description below. Features, objects, and advantages of the various embodiments will be apparent from the description and drawings, and from the claims.

DESCRIPTION OF DRAWINGS

FIG. 1 illustrates an example of a system for accessing data in accordance with certain embodiments of the present disclosure;

FIG. 2B illustrates an example system for interfacing data from a repository implementing certain techniques and components in accordance with one embodiment of the system in FIG. 1;

FIG. 3 illustrates an example of a graph structure of data in accordance with certain embodiments of the present disclosure;

FIG. 9 illustrates an example of an interface for retrieving data in accordance with certain embodiments of the present disclosure;

FIG. 10 illustrates an example interface for instantiating a generic graph in accordance with certain embodiments of the present disclosure;

FIG. 11 illustrates an example hierarchical graph in accordance with certain embodiments of the present disclosure;

FIG. 12 illustrates an example process for using a generic interface with a hierarchical graph as implemented by the system in FIG. 2B;

FIG. 13 illustrates an example recursive node in accordance with certain embodiments of the present disclosure;

FIG. 14 illustrates example attributes of a recursive node in accordance with certain embodiments of the present disclosure;

FIG. 15 illustrates an example recursive node at runtime in accordance with certain embodiments of the present disclosure;

FIG. 16B illustrates an example process for mapping a model representation to a runtime representation as implemented by the example modeling environment of FIG. 16A;

FIG. 17 illustrates an example of a process for applying a filter to a generic graph structure as implemented by the system in FIG. 2B;

FIG. 18A illustrates an example graph after a filter is applied in accordance with certain embodiments of the present disclosure;

FIG. 18B illustrates an example of a skip node replacing some nodes in the graph of FIG. 18A;

FIG. 19 illustrates an example process for generating a graph for a specified time period as implemented by the system in FIG. 2B.

DETAILED DESCRIPTION

Figure 2A:
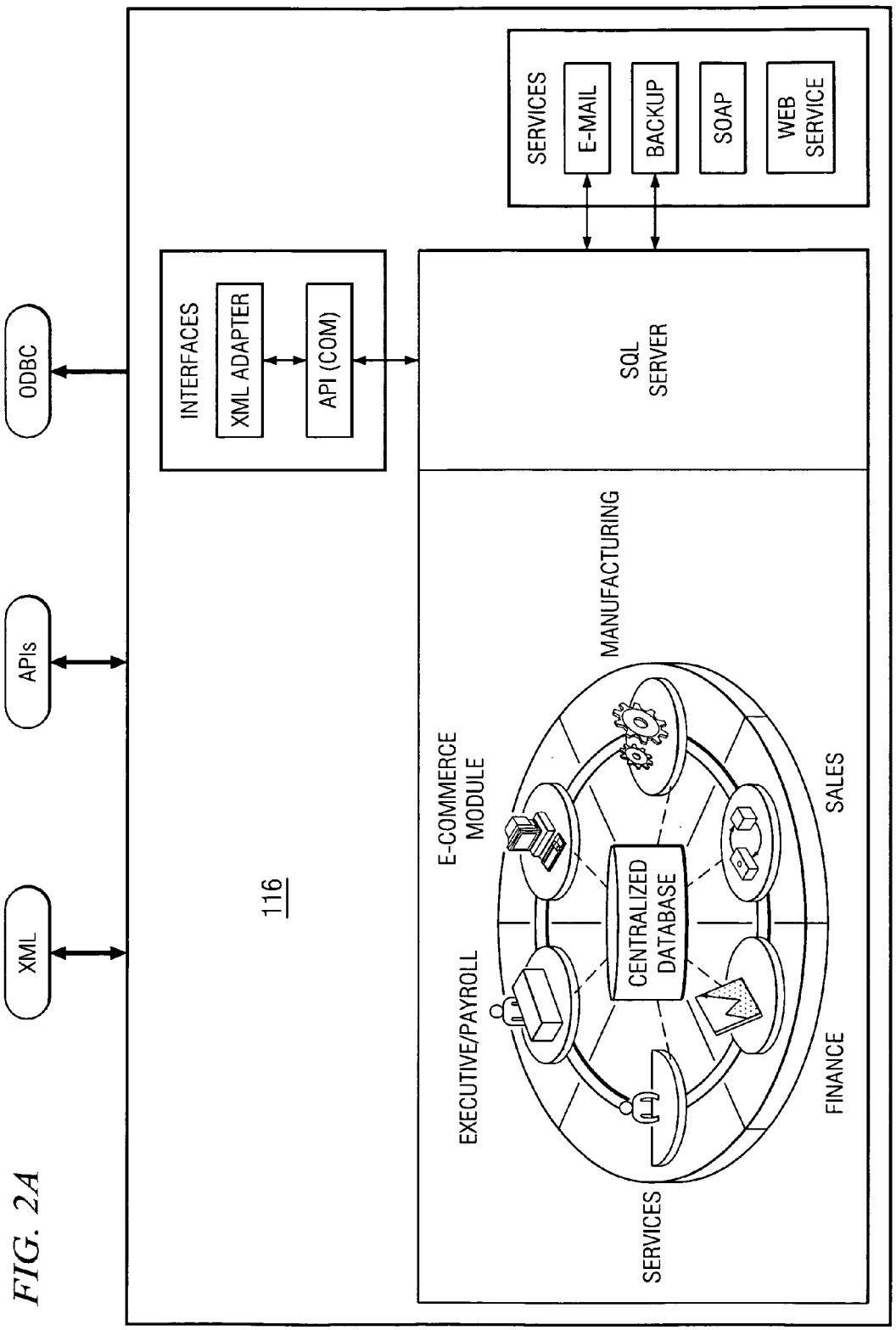
FIG. 2A illustrates an example business application implementing certain techniques and components in accordance with one embodiment of the system in FIG. 1.

Systems and methods may include business interfaces (or other modules or software) to perform various operations such as accessing, processing, and/or modifying data stored, processed, or otherwise represented by graphs. The underlying structure of a data model is termed the data model hierarchy and often takes the form of an oriented acyclic graph. Data models and entity types can be used in several data models. The data model hierarchy can provide a fast process of obtaining an overview of the structure of a data model and the entity types and sub-models participating in it. Specifically, this data model can comprise entity types, relationship categories, and specialization categories. Each entity can be considered a physical or abstract object (for example, Mr. Douglas or the "Sales Information System" project) that can be distinguished from other objects and for which information is to be stored. Semantically-related objects are combined to form their own data model. Complex models are split into smaller sub-models that can themselves also be structured. These data models may utilize any particular data structures or elements, such as business objects. The business object is a set of entity types sharing a common external interface. The business object normally includes a source entity type and those entity types hierarchically dependent on it. The source entity type normally functions as representative of the business object to which it belongs. For example, the entity types Warehouse and Storage bin could be regarded as a business object. In this case, the entity type Storage bin is hierarchically dependent on the entity type Warehouse, which is the source entity type. In short, this data, which is often business data, may be stored in a variety of different graph structures (e.g., hierarchical, directed acyclic, anonymous, identified, time-dependent, and so forth) and in a variety of different repositories (e.g., type, brand, and/or structure) that may affect the way data can be accessed and retrieved. In many cases, system 100 may utilize a generic graph framework (or other graph interface) that is logically decoupled from requesting applications. This generic graph interface may be operable to process, retrieve, traverse, or otherwise access these disparate graphs using various techniques.

For example, some of the graph entities, or their relationships, may be time-dependent. For example, an entity type Plant Material-Consumption could contain the amount of plant material consumed within a specified time period. Since the consumption data for a particular period of time is not known until this time period has expired, no entries exist for the current time period. In another example, an organizational chart may include children (such as subsidiaries, departments, employees, and such) that are associated with the particular active timeframe (such as when the subsidiary was acquired, when the department was decommissioned, employees hired/fired, and so forth). As the datasets are time-dependent, the parents/children (predecessors/successors) are often not processed based on their identifiers, but instead in combination with the corresponding validities. Additionally, the actual validities during evaluation of the graph may yet to be computed for each element out of the validities of its predecessors. One example of the time-dependent graph is the Organizational Structure of a company. Among others, it typically includes different departments (nodes) hierarchically structured via a reporting line (relations). Both the existence of a department and the corresponding reporting line (department B reports to department A) can change over time. As mentioned, the predecessors of each graph element are relevant to the evaluation. Therefore, the current validity that is necessary to get the next level of successors is computed for all validity intersections of the predecessors and its relations. System 100 may retrieve and/or instantiate a graph that includes valid data for a time period and may decrease processing time, since invalid (or inappropriate) data is not retrieved. As such, system 100 may perform or implement various techniques for processing these graphs that may, in certain implementations, simplify development and/or allow generic graph functions to be applied to the graph obtained. This development can present code that is easier to read, as well as graphs that include reduced elements or that are processed more quickly.

In another example, system 100 may use an interface or other application that retrieves data in a generic form useable by the particular business application. In addition, the interface may retrieve the data independent of the graph structure of the data and/or repository on which the data resides. In yet another example, hierarchical data may only include the identity of a parent node rather than relation and relation type identifiers for a node of a graph; system 100 may use recursive nodes to provide relation information to the interface for use in a generic form. Accordingly, system 100 may retrieve hierarchical data in a generic form that may simplify programming and allow the interface or business interface to similarly process data in a hierarchical graph and data in other graph structures.

In yet another example, filters are commonly used by business applications and/or users to more quickly analyze and/or view specific data. System 100 may apply a filter to data in a graph structure using an interface. The filter, which can be based on any suitable business or logical criteria, may be applied upon request from a business application. The interface may determine which portions of the graph structure satisfy the filter criteria. The interface may replace nodes and/or relations that do not satisfy filter criteria with skip nodes or functions. For example, software can be operable to apply a filter to a graph structure that includes nodes and relations between the nodes and evaluating the graph structure according to the filter. The software then replaces a first of the nodes that does not satisfy the filter with a first skip node. Skip nodes may replace nodes and/or relations of a generic form of a graph obtained. Skip nodes can eliminate nodes and relations that do not satisfy filter criteria, which allows a smaller graph to be instantiated and/or presented to the user. Using a graph that (relatively) only includes data satisfying the criteria, may simplify programming. For example, separate programming code that dictates how to process data hidden in the graph may not be required since the data does not meet filter criteria.

In a further example, system 100 (perhaps via the graph interface) may retrieve the data independent of whether the graph structure of the data is an anonymous graph or an identified graph. The interface may utilize a generic graph structure to access data without identifying the graph structure of the data. For example, software may be operable to accessing a first graph structure using a first graph service, where the first graph structure comprises an anonymous graph structure. The software can then access a second graph structure using the same first graph service, where the second structure comprising an identified graph structure.

Turning to the illustrated embodiment, FIG. 1 illustrates an example system 100. Businesses and other users may use system 100 for a variety of applications (e.g., business interfaces) such as managing and maintaining data, business operations, compliance with government, corporate and/or industry standards, etc. System 100 may be a set of directly (e.g., via bus) or indirectly (i.e., via network protocols) coupled servers 110, network 120, and clients 130.

System 100 is typically a distributed environment that spans one or more networks, such as network 120. System 100 may be delivered as packaged software or represented as a hosted solution, often for an enterprise or other small business. Hosted solutions may scale cost-effectively and help drive faster adoption. Hosted solutions may also facilitate execution of upgrades or system-wide changes. Portions of the hosted solution may be developed by a first entity, while other components may be developed by a second entity. For example, while a business application 116 may be developed by a company implementing the solution, the interface 117 may be provided to the company to allow data to be accessed generally by the business interface.

System 100 may include a server 110 that includes an electronic computing device operable to receive, transmit, process and store data associated with system 100. Server 110 may be any computer or processing device such as, for example, a blade server, general-purpose personal computer (PC), Macintosh, workstation, Unix-based computer, or any other suitable device. Server 110 may be computers other than servers, a single server, as well as a server pool. Server 110 may execute operating systems such as Linux, UNIX, Windows Server, or any other suitable operating system. According to some implementations, server 110 is coupled to a web server a mail server and/or other servers.

Server 110 includes memory 113, which may include or communicate with repository 125 (e.g., a database) or other types of memory 113. System 100 may include repositories 125 directly coupled to server 110 or repository 125 indirectly coupled to the server (e.g., via a network 120). Repositories 125 may be any intra-enterprise, inter-enterprise, regional, and/or national electronic storage facility, data processing center, or archive that allows one or a plurality of client(s) 130 and/or servers 110 to dynamically store and retrieve data (e.g., business interfaces or other transaction data and metadata). Repositories 125 may be a central database communicably coupled with one or more servers 110 and clients 130 via a virtual private network (VPN), SSH (Secure Shell) tunnel, or other secure network connection. Repositories 125 may be physically or logically located at any appropriate location including enterprises, off-shore, or any other locations that allows the repository to store information associated with system 100 and communicate data to clients 130. For example, repositories 125 may also include a data store or a warehouse local to server 110. Memory 113 may include volatile and/or nonvolatile memory such as, without limitation, magnetic memory, optical memory, RAM, ROM, Flash, EEPROM, FeROM, PRAM, or any other suitable memory.

Data residing on memory 113 may also include software such as business application 116, interface 117, operating system, and/or other types of software applications. For example, business application 116 may include software for tracking corporate structure, accounting, tracking production or manufacturing, and/or managing business resources. Business application 116 may include a front end facilitating interaction with a user. This software may also include an interface 117 coupled to business application 116. Interface 117 accesses data upon request from business application 116. For example, the connection between the data and business application 116 allowing the interaction, often via interface 117, may be created using Open Database Connectivity (ODBC), Java Database Connectivity (JDBC), OLE DB, or any other suitable database connectivity protocol or technique. Upon establishing (or verifying) the connection, data can be accessed through commands and statements sent by business application 116.

Data 114 may be stored in memory 113 and/or other memories. Such data may include business structure data, financial data, manufacturing data, distribution data, sales data, employee data, human resources data, industry or governmental standard compliance data, safety data, inventory data, or any other data useful to a business. Data may be structured data and represented by graphical structures (e.g., directed graphs, acyclic graphs, hierarchical graphs, or any other graph form). In some embodiments, the graph or data elements (or pointers thereto) may be stored in one or more tables in a relational database described in terms of SQL statements or scripts. In another embodiment, data 114 may be formatted, stored, or defined as various data structures in text files, extensible Markup Language (XML) documents, Virtual Storage Access Method (VSAM) files, flat files, Btrieve files, comma-separated-value (CSV) files, internal variables, or one or more libraries. In short, these data elements may comprise one table or file or a plurality of tables or files stored on one computer or across a plurality of computers in any appropriate format. Indeed, some or all of the data elements may be local or remote without departing from the scope of this disclosure and store any type of appropriate data. Memory 113 may also include any other appropriate data such as VPN applications or services; firewall policies, a security or access log, print or other reporting files, HTML files or templates, child software applications or sub-systems, and others.

Server 110 includes processor 112 that executes instructions and manipulates data to perform operations of server 110. Processor 112 may include, for example, a central processing unit (CPU), a blade, an application specific integrated circuit (ASIC), and/or a field-programmable gate array (FPGA). Although FIG. 1 illustrates a single processor 112 in server 110, multiple processors 112 may be used according to particular needs and reference to processor 112 is meant to include multiple processors 112, where applicable. In the illustrated embodiment, processor 112 executes business application 116. As described in more detail below, business application 116 generally comprises any software operable to process data, specifically graphed data, utilizing one or more of the described techniques. Regardless of the particular implementation, "software" may include software, firmware, wired or programmed hardware, or any combination thereof as appropriate. Indeed, business application 116 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's NET. It will be understood that while business application 116 is illustrated in FIG. 2A as including various sub-modules, business application 116 may include numerous other sub-modules or may instead be a single multi-tasked module that implements the various features and functionality through various objects, methods, or other processes. Further, while illustrated as internal to server 102, one or more processes associated with business application 116 may be stored, referenced, or executed remotely. For example, a portion of business application 116 may be a web service that is remotely called, while another portion of business application 116 may be an interface object bundled for processing at remote client 130. Moreover, business application 116 may be a child or sub-module of another software module or enterprise application (not illustrated) without departing from the scope of this disclosure. Indeed, business application 116 may be a hosted solution that allows multiple parties (such as the manufacturer, vendor, and customer) in different portions of the process to perform the respective processing.

For example, FIG. 2A illustrates one implementation of a business application that accesses data that may be stored in graphs. At a high level, business application 116 is any application, program, module, process, or other software that helps verify the authenticity of a particular product, service, or document (such as a registration form) or implements some portion of the authentication processes. More specifically, business application 116 may offer warranty, refund, or other registration capabilities. For example, business application 116 may allow the user or business to i) manage the entire warranty and claims process, from return materials authorization (RMA) to receipt and inspection; and ii) coordinate with third-party logistics providers to help ensure timely customer credits and avoid unnecessary goodwill allowances. This capability may further support business processes such as warranty initiation and establishment, service provider authorization, verification of warranty entitlement and installed base information, claims adjudication between an OEM and a service provider, and warranty recovery from suppliers.

More specifically, as illustrated in FIG. 2A, business application 116 may be a composite application, or an application built on other applications, that includes an object access layer (OAL) and a service layer. In this example, business application 116 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite business application 116 may run on a heterogeneous IT platform. In doing so, composite application may be cross-functional in that it may drive business processes across different applications, technologies, and organizations. Accordingly, composite business application 116 may drive end-to-end business processes across heterogeneous systems or sub-systems. Business application 116 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite business application 116, it may instead be a standalone or (relatively) simple software program. Regardless, business application 116 may also perform processing automatically, which may indicate that the appropriate processing is substantially performed by at least one component of system 100. It should be understood that automatically further contemplates any suitable administrator or other user interaction with business application 116 or other components of system 100 without departing from the scope of this disclosure.

Returning to FIG. 1, server 110 may also include a communication interface 118 that may allow the server 110 to communicate with other repositories and/or computer systems via a network 120. Communication interface 118 may transmit data from server 110 and/or received data from coupled repositories and/or other computer systems via network protocols (e.g., TCP/IP, Bluetooth, and/or Wi-Fi) and/or a bus (e.g., serial, parallel, USB, and/or FireWire). Server 110 may also include communication interface 118 for communicating with other computer systems, such as clients 130, over network 120 in a client-server or other distributed environment. In certain embodiments, server 110 receives data from internal or external senders through communication interface 118 for storage in memory 113, for storage in repository 125, and/or processing by processor 112. Generally, communication interface 118 comprises logic encoded in software and/or hardware in a suitable combination and operable to communicate with network 120. More specifically, communication interface 118 may comprise software supporting one or more communications protocols associated with network 120 or hardware operable to communicate physical signals.

Network 120 facilitates wireless or wireline communication between computer server 110 and any other local or remote computer, such as clients 130. Network 120 may be all or a portion of an enterprise or secured network. In another example, network 120 may be a VPN merely between server 110 and client 130 across wireline or wireless link. Such an example wireless link may be via 802.11a, 802.11b, 802.11g, 802.20, WiMax, and many others. While illustrated as a single or continuous network, network 120 may be logically divided into various sub-nets or virtual networks without departing from the scope of this disclosure, so long as at least portion of network 120 may facilitate communications between server 110 and at least one client 130. For example, server 110 may be communicably coupled to repository 125 through one sub-net while communicably coupled to a particular client 130 through another. In another example, some vendors or customers may represent local vendors or "walk-in" customers, respectively, that physically interact with business without use of network 120. In other words, network 120 encompasses any internal or external network, networks, sub-network, or combination thereof operable to facilitate communications between various computing components in system 100. Network 120 may communicate, for example, Internet Protocol (IP) packets, Frame Relay frames, Asynchronous Transfer Mode (ATM) cells, voice, video, data, and other suitable information between network addresses. Network 120 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 120 may be a secure network associated with the enterprise and certain local or remote clients 130.

Client 130 may allow a user to access server 110 and/or business application 116 stored on the server. Client 130 may be a computer system such as a personal computer, a laptop, a personal digital assistant, a smart phone, or any computer system appropriate for communicating with server 110. Client 130 is any computing device operable to connect or communicate with server 110 or network 120 using any communication link. At a high level, each client 130 includes or executes at least GUI 136 and comprises an electronic computing device operable to receive, transmit, process and store any appropriate data associated with system 100. It will be understood that there may be any number of clients 130 communicably coupled to server 110. Further, "client 130," "business," and "user" may be used interchangeably as appropriate without departing from the scope of this disclosure. Moreover, for ease of illustration, each client 130 is described in terms of being used by one user. But this disclosure contemplates that many users may use one computer or that one user may use multiple computers. In certain situations, users may include owners, bookkeepers, as well as third party or outside accountants. For the business owner, system 100 may provide or make available, for example, through client 130 and business application 116: i) business status information (seven-day profit & loss report, daily bank statement); ii) customer information (contact information, recent purchases, payment history, credit re-port); and iii) product information (inventory levels, vendor information, unit cost).

As used in this disclosure, the business is any person, department, organization, small business, enterprise, or any other entity that may use or request others to use system 100, namely, business application 116. For simplicity, business may also be termed a client 130, which is intended to encompass a personal computer, touch screen terminal, workstation, network computer, kiosk, wireless data port, smart phone, personal data assistant (PDA), one or more processors within these or other devices, or any other suitable processing device used by or for the benefit of business. For example, client 130 may be a PDA operable to wirelessly connect with external or unsecured network. In another example, client 130 may comprise a laptop that includes an input device, such as a keypad, touch screen, mouse, or other device that can accept information, and an output device that conveys information associated with the operation of server 110 or clients 130, including digital data, visual information, or graphical user interface (GUI). Both the input device and output device may include fixed or removable storage media such as a magnetic computer disk, CD-ROM, or other suitable media to both receive input from and provide output to users of clients 130 through the display, namely the client portion of GUI or business application 116.

Client 130 may include a processor 131, a memory 132, a communication interface 133, and a user interface 134. Processor 131 may include a programmable logic device, a microprocessor, or any other appropriate device for manipulating information in a logical manner and memory 132 may include any appropriate form(s) of volatile and/or nonvolatile memory, such as a repository. Communication interface 133 allows the client 130 to communication to other computers and/or repositories via a network 120. The communication interface 133 communicates with server 110 via one or more network protocols (e.g., TCP/IP, Wi-Fi, 802.11g, 802.11n, IR or Bluetooth). A presentation interface may present data on the client 130 to a user, such as via a monitor and speakers.

A GUI of the business application 116 may be displayed on the user interface 134, such as a monitor, of the client 130. GUI may be operable to allow the user of client 130 to interact with repositories 125 and/or business application 116. Generally, GUI provides the user of client 130 with an efficient and user-friendly presentation of data provided by server 110. GUI comprises a graphical user interface operable to allow the user of client 130 to interface with at least a portion of system 100 for any suitable purpose, such as viewing application or other transaction data. Generally, GUI provides the particular user with an efficient and user-friendly presentation of data provided by or communicated within system 100. GUI may comprise a plurality of customizable frames or views having interactive fields, pull-down lists, and buttons operated by the user. For example, GUI is operable to display certain data 114 in a user-friendly form based on the user context and the displayed data. GUI may also present a plurality of portals or dashboards. For example, GUI may display a portal that allows users to view, create, and manage historical and real-time reports including role-based reporting and such. Generally, historical reports provide critical information on what has happened including static or canned reports that require no input from the user and dynamic reports that quickly gather run-time information to generate the report. Of course, reports may be in any appropriate output format including PDF, HTML, and printable text. Real-time dashboards often provide table and graph information on the current state of the data, which may be supplemented by evaluating the particular graph structure. GUI is often configurable, supporting a combination of tables and graphs (bar, line, pie, status dials, etc.), and is able to build real-time dashboards, where presentation elements (as well as the displayed application or transaction data) may be relocated, resized, and such. It should be understood that the term graphical user interface may be used in the singular or in the plural to describe one or more graphical user interfaces and each of the displays of a particular graphical user interface. Indeed, reference to GUI may indicate a reference to the front-end or a component of business application 116, as well as the particular interface accessible via client 130, as appropriate, without departing from the scope of this disclosure. Therefore, GUI contemplates any graphical user interface, such as a generic web browser or touchscreen, that processes information in system 100 and efficiently presents the results to the user. Server 110 can accept data from client 130 via the web browser (e.g., Microsoft Internet Explorer or Netscape Navigator) and return the appropriate HTML or XML responses to the browser using network 120.

FIG. 2B illustrates an example system 200 for interfacing data from a repository. A business interface 210 may be a software application residing on a computer system, such as a server 110, to perform one or more business operations (e.g., analyze data, access business information, etc.). A business interface 210 may request data 231, 232, 233, 234 stored in a memory such as nonvolatile memory or repository 230. Business interface 210 may not be coupled directly to a repository 230 and/or business interface may not be able to communicate with the repository (e.g., data resides in one or more repositories in an unreadable format by business interface, data resides in multiple forms making direct interface less desirable, etc.). Repositories may be coupled to the server 110 remote to the server 110 such as repositories 125. An interface 220 may be coupled to the business interface 210 and one or more memories such as repository 230. Programming of business interface 210 may be facilitated since the interface communicates with a variety of different memories. Interface 220 may include an algorithm or other decoupled business logic that is capable of working with a generic graph framework for processing one or more graphs for heterogeneous applications. Interface 220 may reside on the server 110.

Data in memories of remote systems and/or computers may be in a graph structure. In some implementations, a graph structure may be associated with a plurality of data sets. The graph structure may be instantiated to produce a graph comprising one of the data sets. FIG. 3 illustrates an example of a graph structure 300 of data comprising an organizational graph of a company. Graph structure 300 includes nodes 301-312 and relations 320-331. Graph structure 300 includes a node 301 that is a root node. The node is the Parent Company. Subsidiary A is node 302 and Subsidiary B is node 303. Parent Company node 301 and Subsidiary A are related by relation 320 and Parent Company node 301 and Subsidiary B are related by relation 321. The relation type of example relation 320 is "parent". Graph structure 300 may include the data illustrated in FIG. 3 when it is instantiated by the interface. The interface may instantiate the graph structure with the organizational data of the Parent Company when requested by the business interface. Business interface 210 may request a portion of graph structure 300. For example, business interface 210 may request relation 320 to determine if subsidiaries of the parent company exist or node 310 to determine if a shop exists.

The node, the node type, the relation, and the relation type may be associated with the node and/or stored with the node. The table below illustrates examples of node types.

NODE TYPE TABLE

| Node type | Description |
| --- | --- |
| NODE_ELEMENT(1) | This node represents an element. |
| NODE_ATTRIBUTE(2) | This node represents an attribute of an element. Note that it is not considered a child of the element node. |
| NODE_TEXT(3) | This node represents the text content of a tag. |
| NODE_CDATA_SECTION(4) | This node represents the CDATA section of the XML source. CDATA sections are used to escape blocks of text that would otherwise be considered as markup. |
| NODE_ENTITY_REFERENCE(5) | This node represents a reference to an entity in the XML document. |
| NODE_ENTITY(6) | This node represents an expanded entity. |
| NODE_PROCESSING_INSTRUCTION(7) | This node represents a processing instruction from the XML document. |
| NODE_COMMENT(8) | This node represents a comment in the XML document. |
| NODE_DOCUMENT(9) | This node represents an XML document object. |
| NODE_DOCUMENT_TYPE(10) | This node represents the document type declaration of the <!DOCTYPE> tag. |
| NODE_DOCUMENT_FRAGMENT(11) | This node represents a document fragment. This associates a node or subtree with a document without actually being part of it. |
| NODE_NOTATION(12) | This node represents a notation in the document type declaration. |

Figure 4:
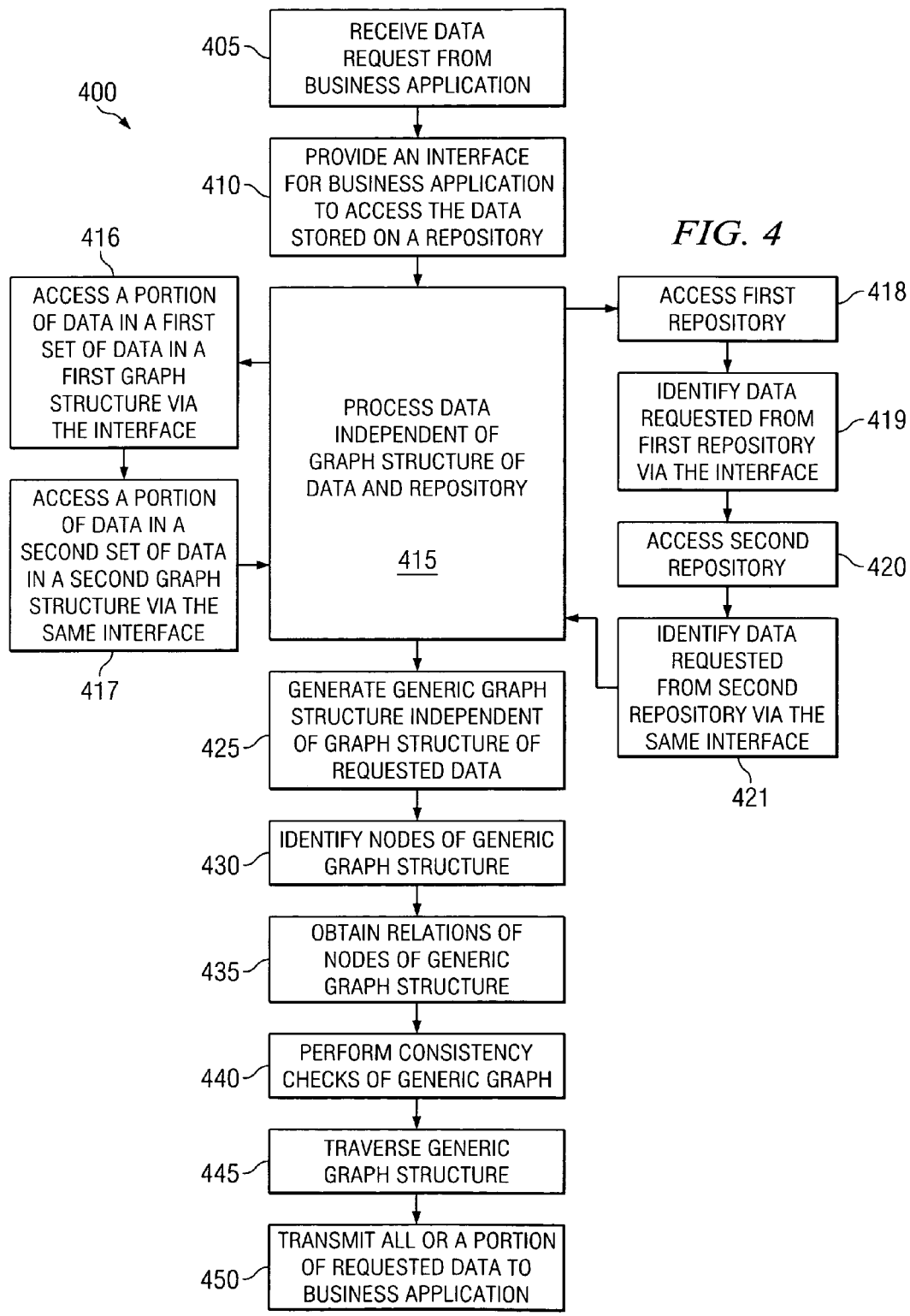
FIG. 4 illustrates an example process for accessing data as implemented by the system in FIG. 2B.

Node, node type, relation, and relation type may be used to form a generic graph structure usable by interface 117 and business application 116. For example, independent of graph structure of data, interface 117 may access data requested by business application 116 using a generic graph structure based on node, node type, relation and/or relation type of the data FIG. 4 illustrates an example process 400 for accessing data remote to a business interface. Regardless of the particular hardware or software architecture used, method 400 is generally capable of accessing data remotely, such as in repositories 125 to a business interface 117. The following description of the flowchart illustrating method 400 focuses on the operation of the business application 116 and the interface 117, or their components or sub-modules, in performing one of their respective methods or processes. But system 100 contemplates using any appropriate combination and arrangement of logical elements implementing some or all of the described functionality.

A data request is received from a business application 116 (at step 405). The data requested resides on a memory remote to the business application 116 such as on a repository 125 and/or on a memory 113 that stores runtime data. An interface for the business application 116 may be provided to access the data stored on a repository (at step 410). The interface 117 may allow the business application 116 to request data in the same format independent of the graph structure of the data or the memory on which the data is stored.

The interface 117 may be allowed to retrieve data independent of the graph structure and/or independent of the repository on which the data is stored (at step 415). For example, data may be stored in various different graph structures (e.g., hierarchical, acyclic, directed, etc.). Data may also be stored in different memories (e.g., different types, different brands, different structures, etc.). The interface may not know or identify the graph structure and/or the memory type, brand, and/or structure prior to accessing the data.

The interface 117 may retrieve a portion of data in a first set of data in a first graph structure (at step 416). A portion of data in a second set of data in a second graph structure may be retrieved via the same interface (at step 417). Allowing the interface to retrieve data independent of the graph structure of the data may facilitate programming, increase processing speed, and/or simplify code used in programming.

The interface 117 may access a first repository (at step 418). The interface 117 may pull the data requested from the first repository via the same interface (at step 419). For example, rather than using a data manager that resides on the repository to push information to the interface, the interface may pull data from the repository or memory. Pull mechanisms for data retrieval may be optimized. The interface may access a second repository (at step 420) and pull data requested from the second repository via the same interface (at step 421).

A generic graph structure including the requested data is generated (at step 425). The generic graph may be independent of the graph structure of the data. In some implementations, a generic graph may be generated based on relation types. Relation types may be utilized to obtain relations of the generic graph.

Figure 5:
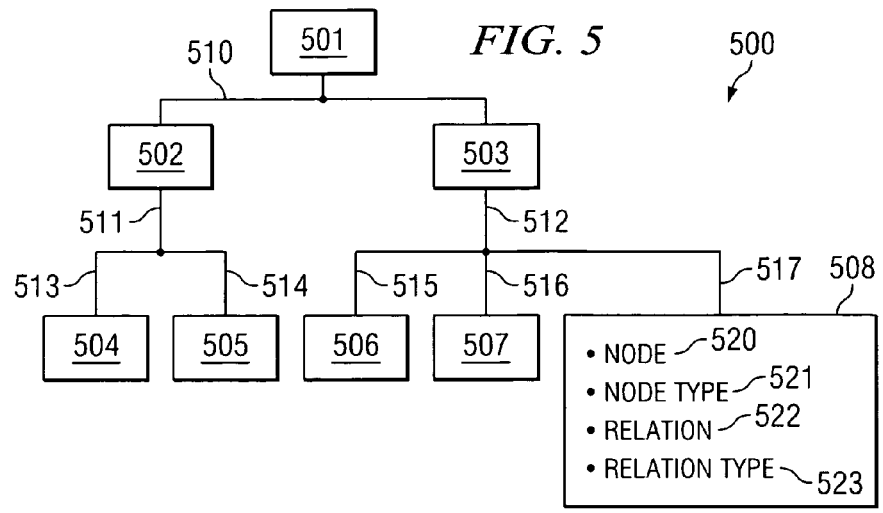
FIG. 5 illustrates an example of a generic graph in accordance with certain embodiments of the present disclosure.

FIG. 5 illustrates an example of a generic graph 500. A generic graph 500 may include nodes 501-508 and relations 510-517 of the data requested. A node may include data that describes the node and the node's relation to other nodes of the generic graph. As an example, node 508 may include attributes such as node 520, node type 521, relation 522, and/or relation type 523. When a generic graph is instantiated, node 508 may include data and/or a path that identifies the storage location of the data.

Information may be obtained from the generic graph via the interface 220. For example, the business interface 210 may be able to access the data via the generic graph 222. Nodes of the generic graph are identified (at step 430) and relations of nodes are obtained from the generic graph structure (at step 430). Consistency checks of the generic graph may be performed (at step 440). The generic graph structure may be traversed (at step 445). Consistency checks and/or traversal of the generic graph 222 may be performed at least partially based on nodes and relations of the generic graph. In some implementations, node identities may be obtained from relations of the generic graph, which may be obtained from relation types.

All or a portion of the requested data may be transmitted to the business interface (at step 450). At least a portion of the generic graph structure may be transmitted via the interface to the business interface, in some implementations. Utilizing the generic graph may allow the business interface and/or the interface to perform generic function on the data. For example, application of a filter may be simplified since the filter may be applied to a generic structure of data. A node type may be used to facilitate application of the filter.

The described operations may be performed in a different order than described and some operations may be added or deleted. For example, less than two or more than two repositories may be accessed. As another example, data from similar graph structures may be obtained. In addition, since a graph structure may not be identified by an interface (e.g., interface 117), when retrieving data it may be unknown whether data from more than one type of graph structure is obtained. Furthermore, generic graphs may not be generalized and data may be directly accessed using the known structure of the generic graph. As another example, relations and/or nodes may not be obtained or. identified and/or relation types and/or node types may be obtained. In addition, consistency checks traversal or other evaluation processing of the generic graph may not be performed. In some implementations, data may be pushed from repositories 125 to interface 117 and interface may present the data to the business application 116 in a usable form.

The preceding flowchart and accompanying description illustrate exemplary method 400. System 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, system 100 may use methods with additional steps, fewer steps, and/or different steps, so long as the methods remain appropriate.

Figure 6:
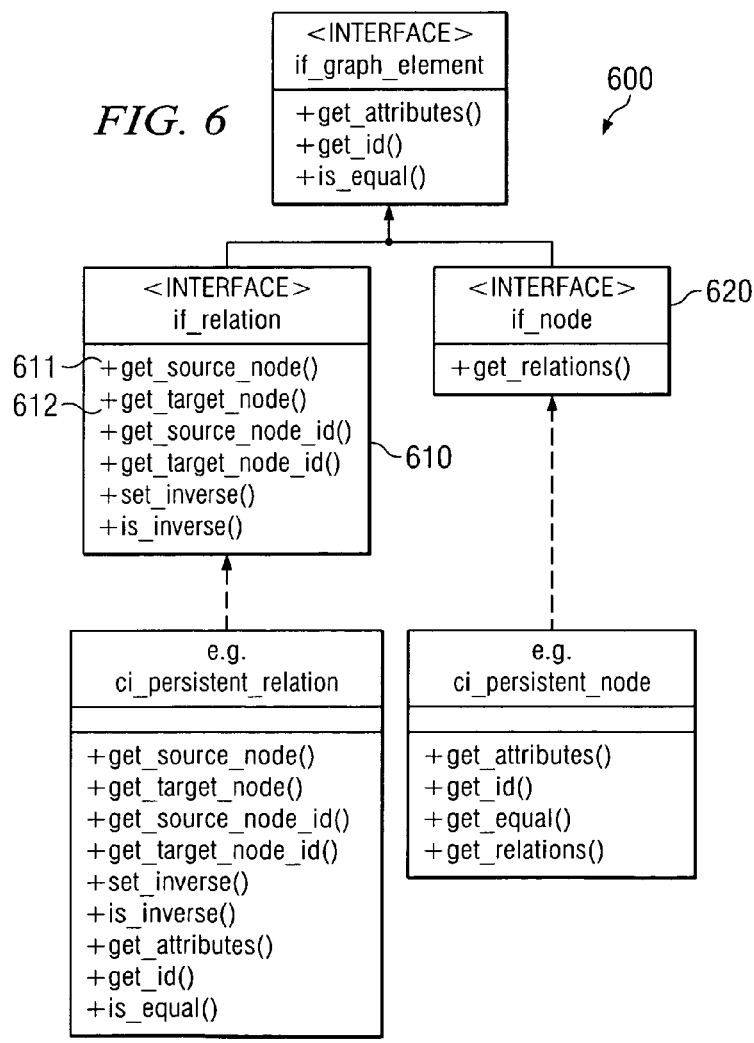
FIG. 6 illustrates another example generic graph in accordance with certain embodiments of the present disclosure.

Although generic graph 500 is illustrated in FIG. 5, other types of generic graphs may be used. FIG. 6 illustrates another example of a generic graph 600. Attributes of data requested are obtained using the generic graph 600. Relation data 610 such as source node 611 and target node 612 are obtained and relations for each node 620 may be obtained to form elements of the generic graph 600.

Figure 7:
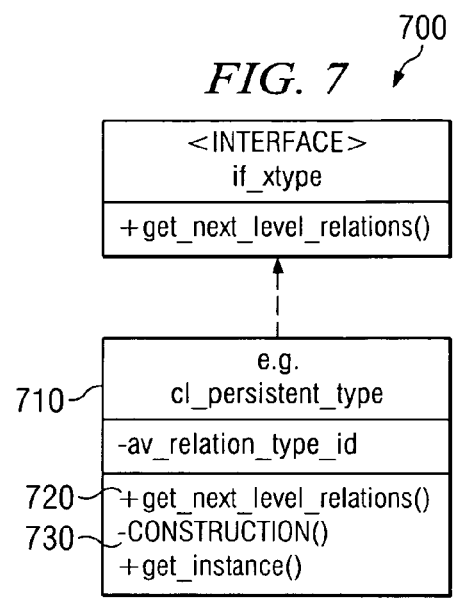
FIG. 7 illustrates an example of a generic graph for retrieval of relations implementing certain techniques and components in accord with one embodiment of the system in FIG. 1.

FIG. 7 illustrates an example of generic graph 700 for retrieval of relations for a graph. Relations 710 for the graph 700 are obtained by obtaining the next level relations 720 for the graph and the instances 730 for each node.

Utilizing a generic graph interface allows generic graph functions to be performed on data in the generic graph. For example, consistency checks and/or traversals may be performed on the generic graph independent of the graph structure. Thus, separate codes need not be written for each type of data, which facilitates programming and increases processing times.

Utilizing a generic graph may allow a business interface to access legacy systems without requiring migration of data into new repositories and/or into similar graph structures. By pulling data from legacy systems into a generic graph, the business interface may access data independent of the storage form in a consistent manner.

In some implementations, the same generic graph may be utilized to allow a business interface to access data from anonymous graphs and identified graphs. Anonymous graphs may be graphs generated at runtime and/or may exist for a finite amount of time. Anonymous graphs may be stored in a memory such as a volatile memory or a memory for temporarily holding data. Anonymous graphs may not include an identifier. Anonymous graphs may be generated to include only a portion of a graph structure in which the data requested resides. Identified graphs may be graphs stored in a repository and may include identifiers to associate nodes and relations with the identified graph. As an example, a portion of an organizational chart of a company for a time period may be generated at runtime and be an anonymous graph while a product catalog for a specific year may be stored in a repository and be an identified graph.

Utilizing a generic graph to access data in anonymous graphs and identified graphs may reduce redundancy in coding the interface which simplifies programming and decreases production costs associated with creating the interface and/or the business interface. In addition, generic functions may be performed on the generic graph independent of whether the graph is an anonymous graph or an identified graph. For example, nodes may be accessed and/or retrieved, cyclic status may be checked, and/or relations may be retrieved.

Figure 8:
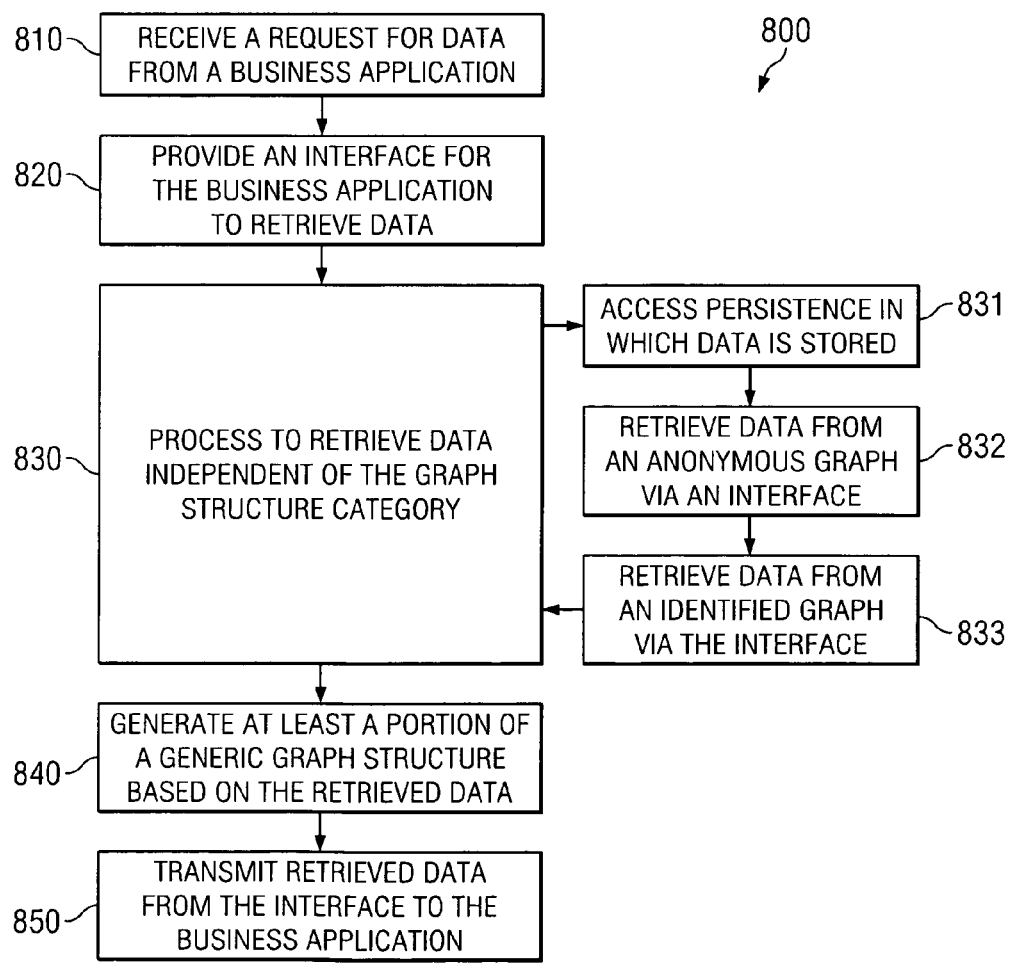
FIG. 8 illustrates an example process for retrieving data independent of the graph structure of the data as implemented by the system in FIG. 2B.

FIG. 8 illustrates an example process for retrieving data independent of whether the graph structure of the data 800 is an anonymous graph or an identified graph. Regardless of the particular hardware or software architecture used, method 800 is generally capable of retrieving data independent of the graph structure in which the data resides in memory 113, repositories 125, or other suitable persistencies. The following description of the flowchart illustrating method 800 focuses on the operation of the business application 116, or its components or sub-modules (such as interface 117), in performing one of their respective methods or processes. But system 100 contemplates using any appropriate combination and arrangement of logical elements implementing some or all of the described functionality.

Data may be retrieved without identifying whether the graph structure is an anonymous graph or an identified graph. A request for data may be received from a business application 116 (at step 810). For example, the business application may transmit an XML message to the graph interface 220 to access data. The interface for the business interface may be instantiated to retrieve the data as appropriate (at step 820).

The interface may retrieve data independent of the graph structure category, such as whether the requested data is organized as an anonymous graph or as an identified graph (at step 830). For example, this retrieval may include one or all of the steps illustrated at steps 831 through 833. The memory or other persistence on which the requested data resides may be accessed by the interface (at step 831). Data from the anonymous graph may be retrieved from the memory via the interface (at step 832). For example, a pull mechanism may be used to retrieve the data. Data from an identified graph may be retrieved via the same interface (at step 833). The interface may not identify the graph structure of the data prior to retrieving the data.

At least a portion of a generic graph structure may be generated based on the retrieved data (at step 840). One or more generic graph functions may be performed on the generic graph structure at least partially based on a request from the business interface. Retrieved data and/or at least a portion of the generic graph may be transmitted to the business interface (at step 850).

The described operations may be performed in a different order than described and some operations may be added or deleted. For example, data may not be received from an anonymous graph or an identified graph. Since a graph structure may not be identified, interface 117 may retrieve a plurality of anonymous and/or identified graphs. Accessing memory may include pulling data from a repository or other memory (e.g., directly retrieving data rather than receiving data from a database manager). As another example, a generic graph may not be generated. Data may be accessed via interface 220 (or generic graph framework 222) upon request from business application 116 using the generic graph structure. For example, a node type may be obtained without generating the generic graph. Retrieving node type may allow business application 116 to determine if a company has subsidiaries from a graph of organizational data for the company.

FIG. 9 illustrates an example of an interface 900 for retrieving data independent of whether the data is in an anonymous graph or identified graph. To obtain a graph structure 910, the generic graph may be traversed 911 and/or roots 912 of the generic graph may be obtained. To obtain a generic graph 920, nodes and relations may be obtained using generic graph services, such as 921 and 922. To determine graph consistence 930 of the generic graph, cardinalities 931 may be checked, acyclicness 932 may be checked, and/or node uniqueness 933 may be checked. FIG. 10 illustrates an example interface 1000 for instantiating a generic graph. The interface 1000 may be used to retrieve the entire graph independent of whether the graph is anonymous graph or identified graph.

FIG. 11 illustrates an example hierarchical graph 1100. A hierarchical graph 1100 has a root node 1101. Nodes 1102-1109 may have a single parent in hierarchical graph 1100. For example, the parent of nodes 1104-1106 is node 1102. Thus, relations 1110-1112 may be the same for among child nodes (e.g., 1102, 1103) of a parent node (e.g., 1101). In addition, a relation type may be common (e.g., parent-child) among the nodes. Thus, rather than storing relation and relation type for each node 1109, a parent identifier 1120 may be stored (e.g., may be an attribute of the node). However, the generic graph described above may require attributes common to graphs such as relation and relation type since not all graphs include nodes with one parent. Thus, relation and relation type may be determined for each node of a hierarchical graph so that the generic graph may interface with the hierarchical graph and generic graph functions may be performed on the hierarchical graph. Using a generic graph to access data and data structure in a hierarchical graph may facilitate programming, reduce redundancy in programming, decrease processing times, and simplify processes by allowing generic graph functions to be performed on the generic graph independent of the true graph structure of the data.

FIG. 12 illustrates a process 1200 for accessing data using a generic graph. Regardless of the particular hardware or software architecture used, method 1200 is generally capable of accessing data stored in repositories 125 using generic graph 500. The following description of the flowchart illustrating method 1200 focuses on the operation of the business application 116 and the interface 117, or their components or sub-modules, in performing one of their respective methods or processes. But system 100 contemplates using any appropriate combination and arrangement of logical elements implementing some or all of the described functionality.

Data may be in any graph form including a hierarchical graph. A request for data in a graph structure, which may be unknown, is received from a business interface (at step 1205). An interface that allows the business interface to access data independent of the graph structure of the data may be provided (at step 1210). For example, the interface may utilize a generic graph to access, represent, and transmit data.

The interface may be allowed to receive the requested data (at step 1215). The interface may, in some implementations, retrieve the data from a hierarchical graph structure (at step 1216). The data and/or the hierarchical graph structure of the data may reside on a memory coupled to the interface. Parent data for one or more nodes of the hierarchical graph may be retrieved (at step 1217). If the nodes of the graph structure do not include a relation, a recursive node may be "generated" or identified to determine relation from a parent identifier of the respective node (at step 1225). A relation type may also be determined using a recursive node, which may be a runtime node. FIG. 15 illustrates an example of a recursive node 1500 at runtime. In the recursive instance, recursive node 1500 may be exploded to subsequently generate a relation 1510, of "recursive" type, between a resulting parent node 1520 and a resulting child node 1530 (such as at step 1225). FIG. 13 illustrates an example recursive node 1300. The recursive node may include a node attribute 1310 that defines itself in terms of the node 1320. FIG. 14 illustrates recursive node data for a recursive node 1400. Recursive node 1400 may include a header 1410 and attributes such as a node or a node identifier 1420 and parent data 1430.

In some implementations, the graph structure of the data requested may be unknown by the interface. A determination may be made whether the nodes of the graph structure or an attribute of the graph structure includes relation and/or relation type (at step 1220 in FIG. 12). For example, in the recursive instance, the recursive node may be used to generate relation and relation type from the parent data retrieved for use by the interface and/or the generic graph of the interface (at step 1218).

If the nodes of the graph structure of the data requested include relation and/or if a recursive node is used to determine relation for a node, at least a portion of a generic graph structure may be generated based on the requested data (at step 1230 in FIG. 12). The interface may be allowed to retrieve data using the generic graph structure (at step 1235). In some implementations, the generic graph structure may not be generated and the interface may retrieve the data requested using the generic graph structure (at step 1235). The requested data may be transmitted to the business application by the interface (at step 1240).

The described operations may be performed in a different order than described and some operations may be added or deleted. For example, a graph structure of data may be unknown so operations 1216-1218 may be deleted and recursive nodes may be used to provide relation information not available from nodes of a graph structure. As another example, receiving data may include pulling data from a repository 113. In addition, receiving a request for data may include receiving an XML manager or HTTP call. Receiving a request from data may also include receiving a request from a user on client 130 via a GUI of business interface 117.

Figure 16A:
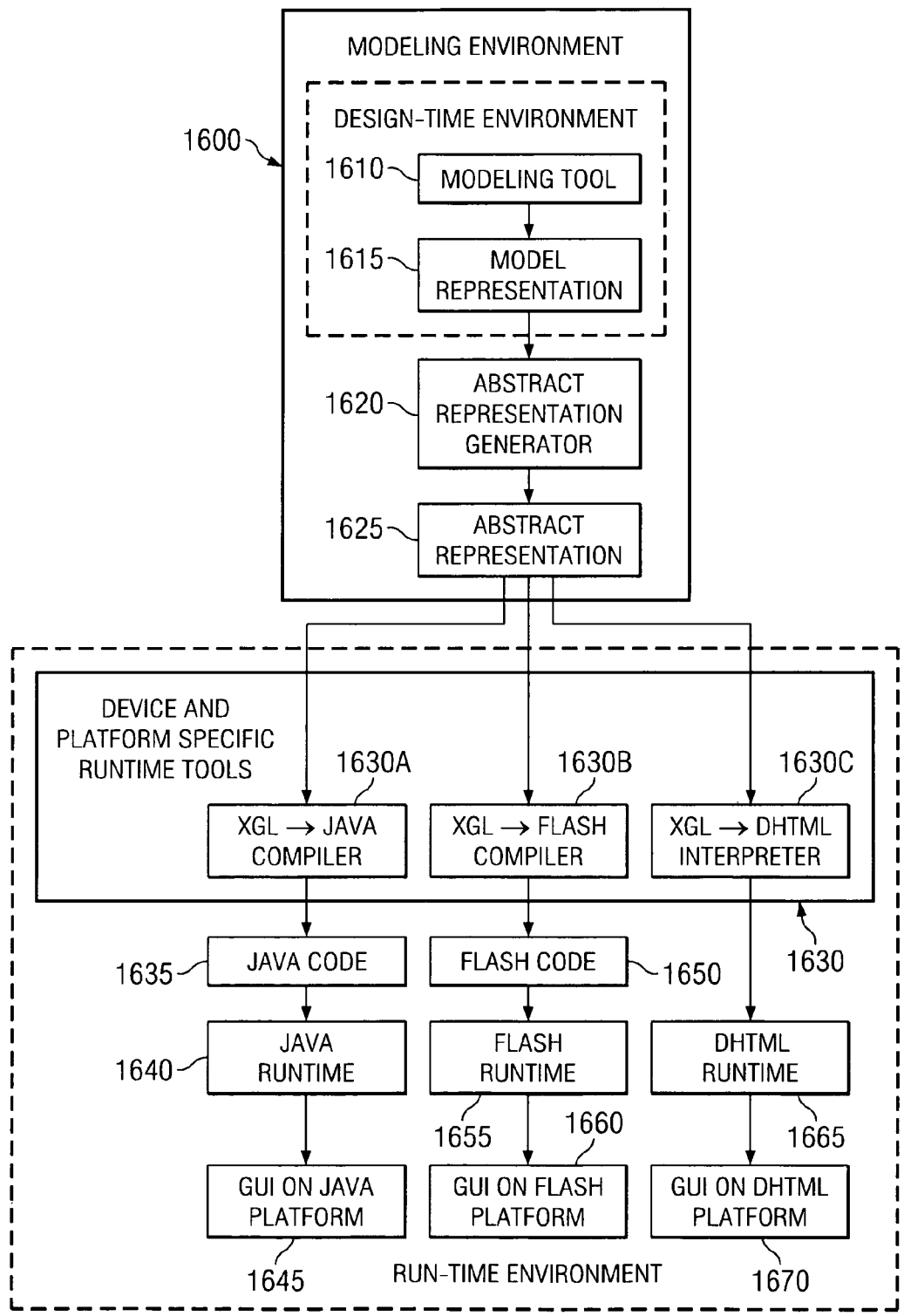
FIG. 16A illustrates an example modeling environment in accordance with certain embodiments of the present disclosure.

The ability to access data from a hierarchical graph structure using a generic graph interface may facilitate software modeling. FIG. 16A depicts an example modeling environment 1600. Such a modeling environment 1600 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

In certain implementations, the modeling environment 1600 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific implementation of XGL is discussed, various other types of XGLs may also be used in alternative implementations. In other words, it will be understood that XGL is used for example description only and may be read to include any abstract or modeling language that can be generic, declarative, and executable.

Turning to the illustrated implementation in FIG. 16A, modeling tool 1610 may be used by a GUI designer or business analyst during the application design phase to create a model representation 1615 for a GUI application. It will be understood that modeling environment 1600 may include or be compatible with various different modeling tools 1610 used to generate model representation 1615. This model representation 1615 may be a machine-readable representation of an application or a domain specific model. Model representation 1615 generally encapsulates various design parameters related to the GUI such as GUI components, dependencies between the GUI components, inputs and outputs, and the like. Put another way, model representation 1615 provides a form in which the one or more models can be persisted and transported, and possibly handled by various tools such as code generators, runtime interpreters, analysis and validation tools, merge tools, and the like. In one implementation, model representation 1615 maybe a collection of XML documents with a well-formed syntax.

Illustrated modeling environment 1600 also includes an abstract representation generator (or XGL generator) 1620 operable to generate an abstract representation (for example, XGL representation or XGL-compliant representation) 1625 based upon model representation 1615. Abstract representation generator 1620 takes model representation 1615 as input and outputs abstract representation 1625 for the model representation. Model representation 1615 may include multiple instances of various forms or types depending on the tool/language used for the modeling. In certain cases, these various different model representations may each be mapped to one or more abstract representations 1625. Different types of model representations may be transformed or mapped to XGL representations. For each type of model representation, mapping rules may be provided for mapping the model representation to the XGL representation 1625. Different mapping rules may be provided for mapping a model representation to an XGL representation.

This XGL representation 1625 that is created from a model representation may then be used for processing in the runtime environment. For example, the XGL representation 1625 may be used to generate a machine-executable runtime GUI (or some other runtime representation) that may be executed by a target device. As part of the runtime processing, the XGL representation 1625 may be transformed into one or more runtime representations, which may indicate source code in a particular programming language, machine-executable code for a specific runtime environment, executable GUI, and so forth, that may be generated for specific runtime environments and devices. Since the XGL representation 1625, rather than the design-time model representation, is used by the runtime environment, the design-time model representation is decoupled from the runtime environment. The XGL representation 1625 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 1625 generated for a model representation 1615 is generally declarative and executable in that it provides a representation of the GUI of model 1615 that is not dependent on any device or runtime platform, is not dependent on any programming language, and unambiguously encapsulates execution semantics for the GUI. The execution semantics may include for example, identification of various components of the GUI, interpretation of connections between the various GUI components, information identifying the order of sequencing of events, rules governing dynamic behavior of the GUI, rules governing handling of values by the GUI, and the like. The abstract representation 1625 is also not GUI runtime-platform specific. The abstract representation 1625 provides a self-contained, closed, and deterministic definition of all aspects of a graphical user interface that is device independent and language independent.

Abstract representation 1625 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUIs generated by the devices are consistent with each other in their appearance and behavior.

Abstract generator 1620 may be configured to generate abstract representation 1625 for models of different types, which may be created using different modeling tools 1610. It will be understood that modeling environment 1600 may include some, none, or other sub-modules or components as those shown in this example illustration. In other words, modeling environment 1600 encompasses the design-time environment (with or without the abstract generator or the various representations), a modeling toolkit (such as 1610) linked with a developer's space, or any other appropriate software operable to decouple models created during design-time from the runtime environment. Abstract representation 1625 provides an interface between the design time environment and the runtime environment. As shown, this abstract representation 1625 may then be used by runtime processing.

As part of runtime processing, modeling environment 1600 may include various runtime tools 1630 and may generate different types of runtime representations based upon the abstract representation 1625. Examples of runtime representations include device or language-dependent (or specific) source code, runtime platform-specific machine-readable code, GUIs for a particular target device, and the like. The runtime tools 1630 may include compilers, interpreters, source code generators, and other such tools that are configured to generate runtime platform-specific or target device-specific runtime representations of abstract representation 1625. The runtime tool 1630 may generate the runtime representation from abstract representation 1625 using specific rules that map abstract representation 1625 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 1625 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 16A, an XGL-to-Java compiler 1630A may take abstract representation 1625 as input and generate Java code 1635 for execution by a target device comprising a Java runtime 1640. Java runtime 1640 may execute Java code 1635 to generate or display a GUI 1645 on a Java-platform target device. As another example, an XGL-to-Flash compiler 1630B may take abstract representation 1625 as input and generate Flash code 1650 for execution by a target device comprising a Flash runtime 1655. Flash runtime 1655 may execute Flash code 1650 to generate or display a GUI 1660 on a target device comprising a Flash platform. As another example, an XGL-to-DHTML (dynamic HTML) interpreter 1630C may take abstract representation 1625 as input and generate DHTML statements (instructions) on the fly which are then interpreted by a DHTML runtime 1665 to generate or display a GUI 1670 on a target device comprising DHTML platform.

It should be apparent that abstract representation 1625 may be used to generate GUIs for Extensible Application Markup Language (XAML) or various other runtime platforms and devices. The same model representation 1625 may be mapped to various runtime representations and device-specific and runtime platform-specific GUIs. In general, in the runtime environment, machine executable instructions specific to a runtime environment may be generated based upon the abstract representation 1625 and executed to generate a GUI in the runtime environment. The same XGL representation may be used to generate machine executable instructions specific to different runtime environments and target devices.

According to certain implementations, the process of mapping a model representation 1615 to an abstract representation 1625 and mapping an abstract representation 1625 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 1625 rather than model representation 1615 for runtime processing, the model representation 1615 that is created during design-time is decoupled from the runtime environment. Abstract representation 1625 thus provides an interface between the modeling environment and the runtime environment. As a result, changes may be made to the design time environment, including changes to model representation 1615 or changes that affect model representation 1615, generally do not substantially affect or impact the runtime environment or tools used by the runtime environment. Likewise, changes may be made to the runtime environment generally to not substantially affect or impact the design-time environment. A designer or other developer can thus concentrate on the design aspects and make changes to the design without having to worry about the runtime dependencies such as the target device platform or programming language dependencies.

FIG. 16B depicts an example process for mapping a model representation 1615 to a runtime representation using the example modeling environment 1600 of FIG. 16A or some other modeling environment. Model representation 1615 may comprise one or more model components and associated properties that describe a hierarchical data object. As described above, at least one of these model components is based on or otherwise associated with hierarchical data elements. The abstract representation 1625 is generated based upon model representation 1615. Abstract representation 1625 may be generated by the abstract representation generator 1620. Abstract representation 1625 comprises one or more abstract GUI components and properties associated with the abstract GUI components. As part of generation of abstract representation 1625, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations, including GUIs for specific runtime environment platform, may be generated from abstract representation 1625. A device-dependent runtime representation 1630*a*, 1630*b* may be generated for a particular type of target device platform to be used for executing and displaying the GUI encapsulated by the abstract representation. The GUIs generated from abstract representation 1625 may comprise various types of GUI elements such as buttons, windows, scrollbars, inputs boxes, etc. Rules may be provided for mapping an abstract representation to a particular runtime representation. Various mapping rules may be provided for different runtime environment platforms.

One or more generic graph functions may be performed on the generic graph structures generated. For example, filters are commonly used to reduce the amount of data displayed on a business interface, to selectively view data with common characteristics, and for analysis purposes. FIG. 17 illustrates an example process 1700 of using skip nodes with the application of filters. Regardless of the particular hardware or software architecture used, method 1700 is generally capable of applying skip nodes to nodes and/or relations that do not satisfy criteria of a filter applied to graphs such as generic graph 500 created by business application 116. The following description of the flowchart illustrating method 1700 focuses on the operation of the business application 116, or their components or sub-modules, in performing one of their respective methods or processes. But system 100 contemplates using any appropriate combination and arrangement of logical elements implementing some or all of the described functionality.

A request for application of a filter to data in a graph structure may be received from the business application 116 (at step 1710). A memory or other persistence in which the data is stored or referenced may be accessed via an interface (at step 1720). The requested data may be retrieved from the memory (at step 1730).

The filter may be applied to the data (e.g., an instantiated graph structure or nodes and/or relations) in the graph structure (at step 1740). The data may be evaluated according to the filter criteria (at step 1750). Node(s) that do not satisfy the filter criteria are replaced with skip function(s) (at step 1760).

A skip function may point from the last valid node according to filter criteria to the next valid node according to filter criteria. FIG. 18A illustrates an example of a graph 1800. Application of a filter to graph 1800 may determine that nodes 1810 and 1830 satisfy the filter criteria and node 1820 does not satisfy filter criteria. Node 1820 may be replaced with a skip function or relation. FIG. 18B illustrates graph 1800 of FIG. 18A with a skip relation 1850 replacing node 1820 which did not satisfy the filter criteria. A skip function may replace more than one node that does not satisfy the filter criteria as appropriate.

A skip node may identify the last valid node (e.g., last node in a branch of a graph to satisfy filter criteria before node that does not satisfy filter criteria), next valid node (e.g., next node that satisfies filter criteria in the branch after node that doesn't satisfy filter criteria), an outgoing relation of the last valid node, and/or the incoming relation of the next valid node. The skip path may be an attribute of the skip function as well.

The graph structure may be instantiated such that portions of the graph replaced with skip functions are not present in the instantiated graph (at step 1770). Data may be retrieved from the instantiated graph (at step 1780) and the retrieved data and/or at least a portion of the instantiated graph may be transmitted to the business interface (at step 1790).

The described operations may be performed in a different order than described and some operations may be added or deleted. For example, receiving a request for application of a filter may include allowing a user to select a filter from a drop-down menu and/or enter criteria on a GUI of business application 116. As another example, graph may not be instantiated (e.g., filter may be applied to an uninstantiated graph). In addition, filter may be applied to generic graph 500 and/or data in the generic graph used to retrieve data independent of graph structure and/or repository in which data is stored.

Replacing nodes of the graph that do not satisfy filter criteria with skip functions may decrease processing and/or access times since the graph is streamlined to data of interest to the user and/or business interface. In addition, replacing nodes that do not satisfy with skip functions rather than hiding or suppressing the nodes reduces the need for programming code to process the suppression of nodes that do not satisfy filter criteria (for example, programming code relating to the treatment of suppressed elements is not required for traversing the graph after application of the filter criteria). In addition, replacing nodes that do not satisfy criteria with skip functions may reduce required storage space since the nodes will not exist in the graph structure after application of the filter at runtime.

In some implementations, graphs may include temporal data or data valid for a specified time period (e.g., 1900-1955, 1965 to present, and so forth.). Business applications may request data valid for a specified time period or specified validity period for various purposes. As an example, a business application may request a corporate structure during a specified time period. The interface may be used to access data independent of the graph structure and generate a generic graph valid for the specified time period. The generic graph may be instantiated with data from a memory coupled to the interface.

FIG. 19 illustrates an example process 1900 for generating a graph for a specified time period. Regardless of the particular hardware or software architecture used, method 1900 is generally capable of instantiating a graph for a specified time period using business application 116 and data from repositories 125. The following description of the flowchart illustrating method 1900 focuses on the operation of the business application 116, or their components or sub-modules, in performing one of their respective methods or processes. But system 100 contemplates using any appropriate combination and arrangement of logical elements implementing some or all of the described functionality. The interface may be provided with a validity period (e.g., a specified time period) by the business application (at step 1905). For example, the user may access the front end of the business application and enter a validity period of interest to the user.

The validity of one or more nodes of the graph structure may be determined or otherwise identified, perhaps via sub-nodes or data stored in the respective node (at step 1910). The client-provided validity period may be compared to the validity period of node(s) (at step 1915). A determination may be made whether the provided validity period overlaps with the node validity (at step 1920). If overlap exists, then the validity is valid for the node(s) with overlap in validity periods (at step 1925). If overlap does not exist, then the validity is invalid for the node(s) without overlap in validity periods (at step 1930). In some implementations, if a validity of a node is invalid, then validities of child nodes of the invalid node may not be determined (since children of the node share attributes such as validity period). In addition, if the validity period of a node is less than the provided validity period the provided validity may be modified when applied to child nodes of the node. For example, if a provided validity period is 1955-present and first node has a validity period of 1975-present, the provided validity period may be modified to 1975-present when applied to child nodes of the first node. As another example, if the provided validity period is 1955-1987 and a validity period of a second node is 1945-1967, the provided validity period may be modified to 1955-1967 when applied to child nodes of the second node.

The validity of one or more relations of the graph structure is determined (at step 1940). The provided validity period may be compared to the validity period of relation(s) of a graph structure (at step 1945). A determination may be made whether the provided validity period overlaps with the validity period of the relation(s) (at step 1950). If the validity periods overlap, then the validity is valid for the relation(s) (at step 1955). If the validity periods overlap, then the validity is invalid for the relation(s) (at step 1960).

A graph valid for the validity period based on the validities of node(s) and relation(s) may be generated (at step 1965). The generated graph may be a generic graph structure. A graph may include validity periods for node(s) and or relation(s). The generated graph may include valid nodes and/or relations and hide, suppress, or mark invalid nodes. Invalid nodes may be skipped and/or replaced with skip functions. Validities of the node(s) and/or relation(s) may be stored (e.g., as an attribute of the node) (at step 1970). At least a portion of the generated graph may be transmitted to the business application (at step 1980). In some implementations, valid nodes and/or relations may be highlighted, colored, or otherwise designated by the business application to facilitate interpretation by a user.

The described operations may be performed in a different order than described and some operations may be added or deleted. For example, a validity of a relation may be determined prior to determining a validity of a node. As another example, validities may be stored in volatile or runtime memory. In addition, validity or a node may not be determined if a parent or parent relation is invalid. As another example, a validity period may be modified (e.g., truncated) when a validity period of a node or relation is less than a provided validity period (e.g., validity period requested by business interface 117).

The preceding flowchart and accompanying description illustrate exemplary method 1900. System 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, system 100 may use methods with additional steps, fewer steps, and/or different steps, so long as the methods remain appropriate.

Figure 20:
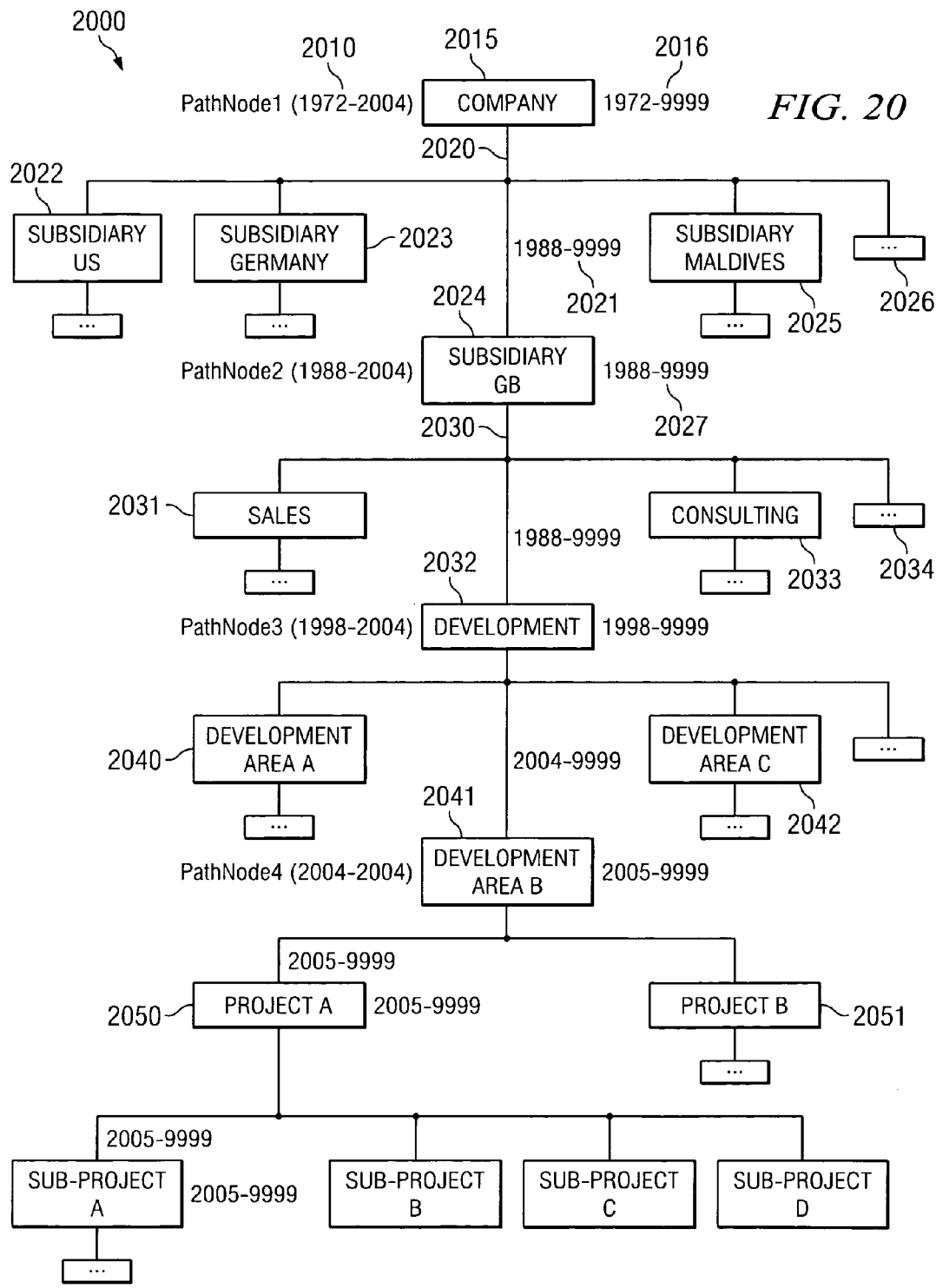
FIG. 20 illustrates an example graph for a company organizational structure in accordance with certain embodiments of the present disclosure.

FIG. 20 illustrates an example of a graph 2000 including temporal data. Graph 2000 includes data regarding a company's organizational structure. A user uses a business application to determine the company's organizational structure between 1972 and 2004. The business interface may request the information from the interface that is coupled to repositories in which the requested information resides. The interface may retrieve the requested information independent of the graph structure in which the data resides and/or independent of the repository in which the information is stored.

The interface may then compare the validity period (1972-2004) 2010 to the validity period 2016 of the root node 2015 labeled 'Company'. The validity period 2016 for the Company node 2015 is 1972 to 9999. Therefore, upon comparison of the validity periods, the Company node 2015 is valid for the validity period 2010. The interface may compare the validity period 2020 of the relation 2021 between the child nodes 2022-2025 of the Company node 2015 to determine if the relation is valid for the validity period 2010. Since the relation validity period 2021 is 1988-9999, the relation 2020 is valid for the validity period. Since the relation validity period 2021 is less than the provided validity period 2010, the provided validity period is modified to 1988-2004. The validity periods of the child nodes 2022-2026 of the Company node 2015 are then compared to the modified validity period. Subsidiary GB node 2024 has a validity period overlapping 2027 with the modified validity period and is therefore valid. The modified validity period may be modified again to 1999-2004 since the Subsidiary GB node 2024 is valid from 1999-9999. Nodes of Subsidiary US 2022, Subsidiary Germany 2023, and Subsidiary Maldives 2025 are invalid and not further traversed due to the invalidity for the validity period.

The Subsidiary GB node 2024 is further traversed to determine if a relation node 2030 between the Subsidiary GB node and its child nodes is valid. Since the relation node is valid, the validity periods of the child nodes 2031-2034 of Subsidiary GB node 2030 are compared to the twice modified validity period. Development Area A 2040 is valid from 2004-2004; the node is valid for the twice modified validity period. The branch of the graph relating to Development Area A may be further traversed to generate the valid nodes and relations for the graph. Since the Development Area B node 2041 is valid from 2005-9999, the validity periods do not overlap and the node is invalid. The traversal of child nodes 2050, 2051 of the Development Area B may be terminated due to the node invalidity. Likewise, if Development Area C 2042 is determined to be invalid for the validity period, the traversal of its child nodes may be terminated. Valid nodes and/or relations may used to generate a graph of data valid for the validity period. The generated graph may include validity periods for the nodes and/or relations. The invalid nodes may not be presented in the generated graph. The generated graph may be a runtime graph requested by the business interface.

A number of implementations have been described. Nevertheless, it will be understood that various modifications may be made. For example, the preceding flowcharts and accompanying description illustrate exemplary methods, such as 800, 1200, 1700, and 1900. System 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, system 100 may use methods with additional steps, fewer steps, and/or different steps, so long as the methods remain appropriate. Accordingly, other implementations are within the scope of this application.

What is claimed is:

1. A computer implemented method for structure evaluation of time-dependent acyclic graphs, the method comprising the following steps performed by at least one hardware processor:
  processing a data model of a stored data repository, wherein at least a subset of data model nodes include at least one recursive node stored in the data model, the at least one recursive node including an identifier of the particular recursive node's parent node;
  identifying a runtime transient relation between the at least one recursive node and an identified parent node, the parent node identified using a generic graph service and the identified parent node stored in the at least one recursive node, and wherein the transient relation between the at least one recursive node and the identified parent node is generated at runtime;
  instantiating an acyclic graph structure using the generic graph service, the acyclic graph structure including the runtime transient relation between the at least one recursive node and the identified parent node based on the processed data model, and wherein the generic graph service provides functionality for a software application to retrieve data from the acyclic graph structure without identifying the structure of the acyclic graph structure;
  determining a validity of at least one node of the acyclic graph structure, with the at least one hardware processor, by comparing an identified validity period to the at least one node of the acyclic graph structure, each of at least a subset of the at least one node associated with a particular time period;
  identifying at least one invalid node, the at least one invalid node associated with a time period outside the identified validity period;
  removing the at least one identified invalid node;
  substituting, for each of the at least one removed invalid nodes, a corresponding skip node, where each skip node corresponds to a single removed invalid node, each skip node including a skip function, each skip function defining a skip relation that defines a relationship for valid nodes adjacent each skip node, the relationship pointing from a last valid node located before the skip node to a next valid node located after the skip node;
  generating a validity graph for the identified validity period including:
    at least one of the nodes of the acyclic graph structure that is valid for the identified validity period based on the time period associated with each of the at least one nodes, and
    at least one skip relation for each skip node, where data in the at least one invalid node is absent from the validity graph; and
  storing the validity graph in a repository.

2. The method of claim 1, the acyclic graph structure comprising at least one time-dependent relation associated with the at least one node, and the method further comprising generating the validity graph for the validity period by comparing the identified validity period to a time period of at least one of the time-dependent relations of the acyclic graph structure.

3. The method of claim 1 further comprising determining a validity for at least one of the nodes based on the lesser of the identified validity period or the validity period of a parent of the node.

4. The method of claim 1 further comprising skipping at least one node in which a parent of the at least one node is not valid for the identified validity period.

5. The method of claim 1, wherein the acyclic graph structure is a runtime graph.

6. The method of claim 1 further comprising storing the determined validity of at least one of the nodes of the acyclic graph structure in the repository.

7. The method of claim 1 further comprising storing a joint validity period for at least one predecessor node in a node attribute.

8. The method of claim 1 further comprising transmitting at least a portion of the acyclic graph structure to a business application.

9. A computer program product encoded on a tangible storage medium for structured evaluation of time-dependent acyclic graphs comprising computer readable instructions for causing at least one hardware processor to perform operations comprising:
  processing a data model of a stored data repository, wherein at least a subset of data model nodes include at least one recursive node stored in the data model, the at least one recursive node including an identifier of the particular recursive node's parent node;
  identifying a runtime transient relation between the at least one recursive node and an identified parent node, the parent node identified using a generic graph service and the identified parent node stored in the at least one recursive node, and wherein the transient relation between the at least one recursive node and the identified parent node is generated at runtime;
  instantiating an acyclic graph structure using the generic graph service, the acyclic graph structure including the runtime transient relation between the at least one recursive node and the identified parent node based on the processed data model, and wherein the generic graph service provides functionality for a software application to retrieve data from the acyclic graph structure without identifying the structure of the acyclic graph structure;
  determining a validity of at least one node of the acyclic graph structure by comparing an obtained validity period to the at least one node of the acyclic graph structure with the at least one hardware processor, each of at least a subset of the at least one node associated with a particular time period;
  identifying at least one invalid node, the at least one invalid node associated with a time period outside the identified validity period;
  removing the at least one invalid node;
  substituting, for each of the at least one removed invalid nodes, a corresponding skip node, where each skip node corresponds to a single removed invalid node, each skip node including a skip function, each skip function defining a skip relation that defines a relationship for valid nodes adjacent each skip node, the relationship pointing from a last valid node located before the skip node to a next valid node located after the skip node;
  automatically generating a validity graph for the validity period including at least one of the nodes of the acyclic graph structure that are valid for the validity period based on the particular time period associated with the at least one node, and invalid nodes replaced by skip relations in the validity graph such that data in the invalid nodes are absent from the validity graph; and storing the validity graph in the tangible storage medium.

10. The computer program product of claim 9, the acyclic graph structure comprising at least one time-dependent relation associated with the at least one node and the software further operable to generate the validity graph for the validity period by comparing the identified validity period to a time period of at least one of the time-dependent relations of the acyclic graph structure.

11. The computer program product of claim 9 further operable to determine a validity for at least one of the nodes based on the lesser of the identified validity period or the validity period of a parent of the node.

12. The computer program product of claim 9 further operable to skip at least one node in which a parent of the at least one node is not valid for the identified validity period.

13. The computer program product of claim 9, wherein the acyclic graph structure is a runtime graph.

14. The computer program product of claim 9 further operable to store the determined validity of at least one of the nodes of the acyclic graph structure.

15. The computer program product of claim 9 further operable to store a validity period for predecessor nodes in a node attribute.

16. The computer program product of claim 9 further operable to transmit data associated with at least a portion of the acyclic graph structure to a business application.

17. A system for efficiently filtering graphs comprising:
a repository for storing at least one acyclic graph structure; and
at least one processor operable when executed to:
process a data model of a stored data repository, wherein at least a subset of data model nodes include at least one recursive node stored in the data model, the at least one recursive node including an identifier of the particular recursive node's parent node;
identify a runtime transient relation between the at least one recursive node and an identified parent node, the parent node identified using a generic graph service and the identified parent node stored in the at least one recursive node, and wherein the transient relation between the at least one recursive node and the identified parent node is generated at runtime;
instantiating the at least one acyclic graph structure using the generic graph service, the acyclic graph structure including the runtime transient relation between the at least one recursive node and the identified parent node based on the processed data model, and wherein the generic graph service provides functionality for a software application to retrieve data from the acyclic graph structure without identifying the structure of the acyclic graph structure;
determine a validity of at least one node of one of the at least one acyclic graph structures by comparing an identified validity period to the at least one node of the graph structure, each of at least a subset of the at least one node associated with a particular time period and the at least one acyclic graph structure comprising at least one time-dependent relation associated with the at least one node;
generate a validity graph for the validity period including one or more of the nodes of the graph structure that are valid for the identified validity period based on the respective time period, the generation of the validity graph includes replacing at least one node of the at least one acyclic graph structure in which a parent of the particular node is invalid for the identified validity period with a skip node, the skip node including a skip function defining a skip relation that defines a relationship for valid nodes adjacent each skip node, the relationship pointing from a last valid node located before the skip node to a next valid node located after the skip node;
instantiate the validity graph, the instantiated validity graph including one or more nodes of the graph structure that are valid for the identified validity period and at least one skip relation for each skip node; and
store the validity graph in the repository.

18. The system of claim 17 wherein data in the invalid node are absent from the validity graph.

19. The system of claim 17 further operable when executed to generate the validity graph for the validity period by comparing the identified validity period to a time period of at least one of the relations of the at least one acyclic graph structure.

* * * * *